(12) United States Patent
Okuno

(10) Patent No.: US 11,789,669 B2
(45) Date of Patent: Oct. 17, 2023

(54) RECORDING DEVICE, RECORDING SYSTEM, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/709,612

(22) Filed: Mar. 31, 2022

(65) Prior Publication Data

US 2022/0317939 A1 Oct. 6, 2022

(30) Foreign Application Priority Data

Mar. 31, 2021 (JP) ................................. 2021-060104

(51) Int. Cl.
*G06F 3/12* (2006.01)

(52) U.S. Cl.
CPC ............ *G06F 3/121* (2013.01); *G06F 3/1256* (2013.01); *G06F 3/1292* (2013.01); *G06F 3/1204* (2013.01)

(58) Field of Classification Search
CPC ...... G06F 3/121; G06F 3/1256; G06F 3/1292; G06F 3/1203; G06F 3/1224; G06F 3/1229; G06F 3/1239; G06F 3/1204

USPC ......................................................... 358/1.1
See application file for complete search history.

(56) References Cited

U.S. PATENT DOCUMENTS

| 2015/0188611 | A1 | 7/2015 | Tsuzuki |
| 2016/0127600 | A1* | 5/2016 | Beatty ................ H04N 1/00244 358/1.15 |
| 2021/0011673 | A1* | 1/2021 | Masai ................... G06F 3/1285 |

FOREIGN PATENT DOCUMENTS

| JP | 2002-137501 A | 5/2002 |
| JP | 2013-187567 A | 9/2013 |
| JP | 2015-126491 A | 7/2015 |

* cited by examiner

*Primary Examiner* — Darryl V Dottin
(74) *Attorney, Agent, or Firm* — Scully, Scott, Murphy & Presser, PC

(57) ABSTRACT

A printer of a printing system is configured to a printing operation with a print engine within a range of the permitted number of sheets. The printer transmits notification information, to a terminal device, in accordance with a status of the printer such as a registration status of a server, the permitted number of sheets for printing, an ink remaining amount or the like in response to a short-range wireless communication between a short-range wireless communication interface and the terminal device.

14 Claims, 9 Drawing Sheets

PRINTER MANAGEMENT TABLE PTB

| DEVICE ID | dv1 |
|---|---|
| PERMITTED NUMBER OF SHEETS FOR PRINTING | pr1 |
| INK REMAINING AMOUNT | ink1 |
| DEVICE SETTING | dc1 |

FIG. 2

SERVER MANAGEMENT TABLE STB

| DEVICE ID | dv1 | dv2 | dv3 |
|---|---|---|---|
| PERMITTED NUMBER OF SHEETS FOR PRINTING | pr1 | pr2 | pr3 |
| INK REMAINING AMOUNT | ink1 | ink2 | ink3 |

FIG. 3

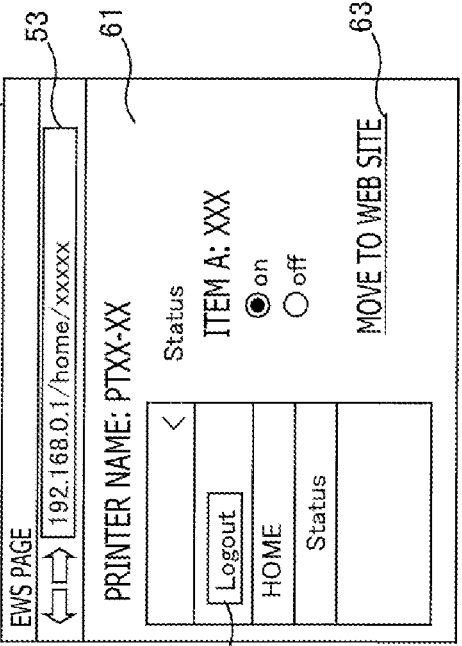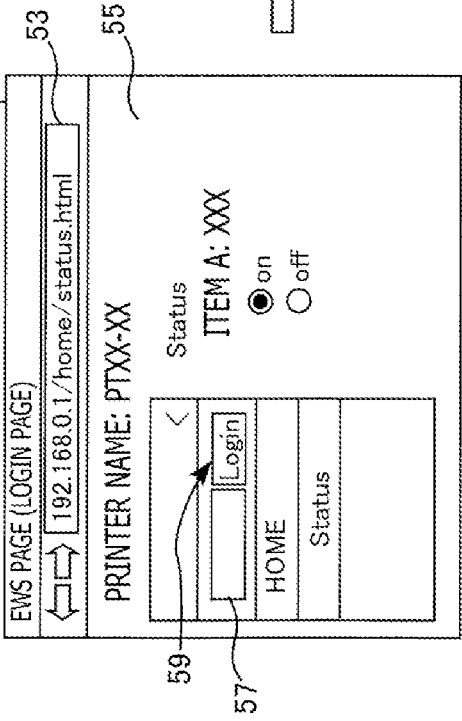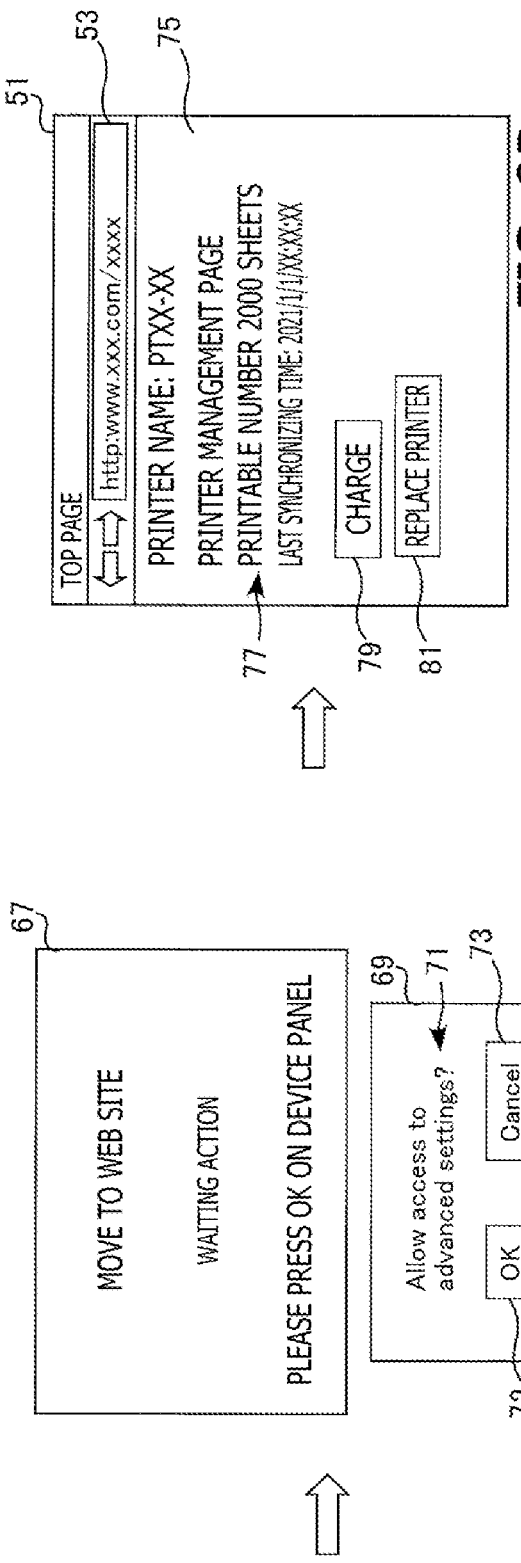

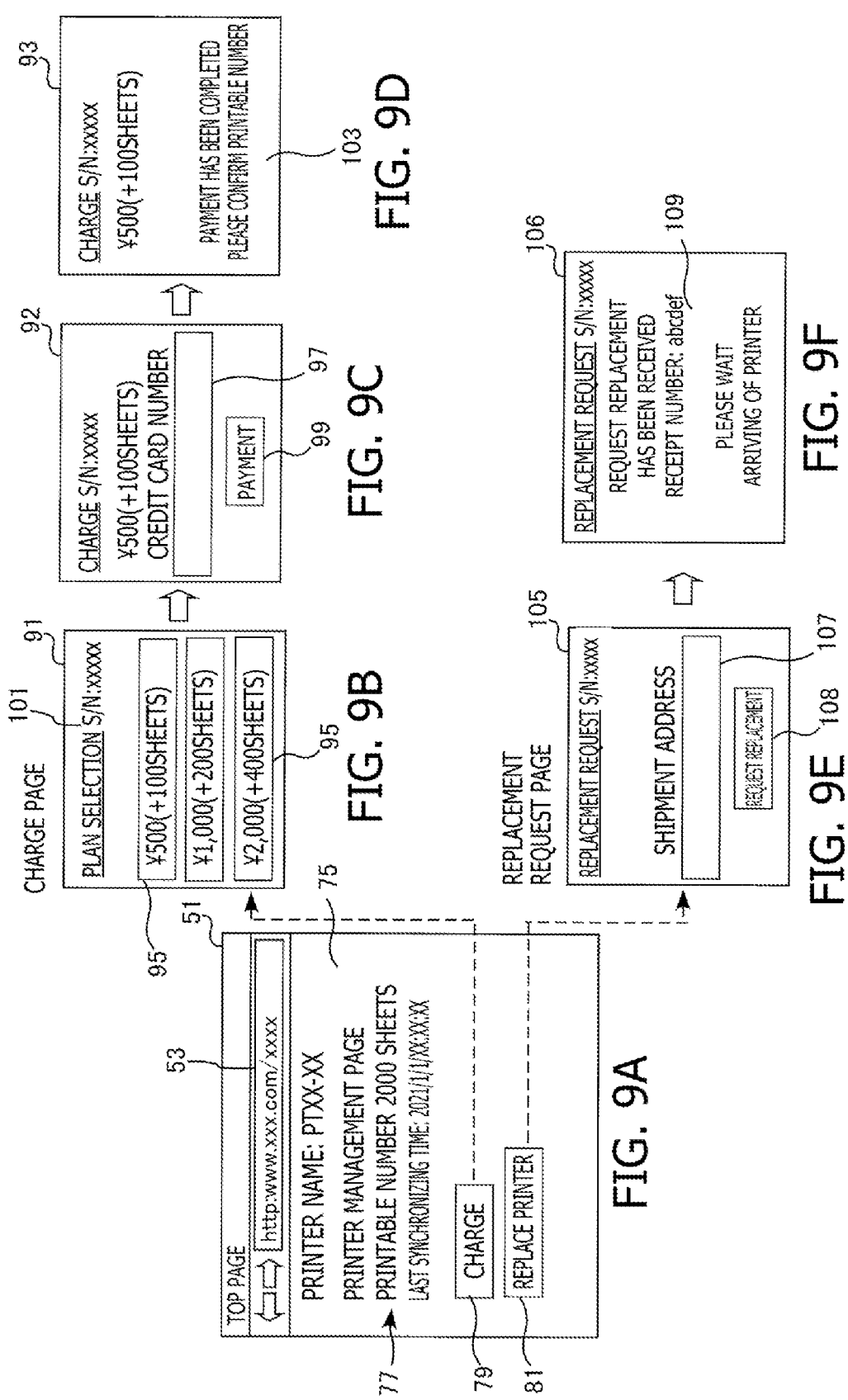

RECORDING DEVICE, RECORDING SYSTEM, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2021-060104 filed on Mar. 31, 2021. The entire subject matter of the application is incorporated herein by reference.

BACKGROUND

The present disclosures relate to a recording device, a recording system and a non-transitory computer readable recording medium containing computer-executable instructions therefor.

There has been known a printing system in which the number of sheets a printer is permitted to print is managed. Such a printer is typically equipped with a card interface to which a memory card is attachable, and is configured to execute printing based on the permitted number of sheets which is stored in the memory card. The user of the printer is allowed to have the printer print only the permitted number of sheets stored in the memory card. Typically, the user can continue to use such a printing service by purchasing the permitted number of sheets on which the printing is to be performed.

SUMMARY

In the printing service described above, the information to be notified to the user differs depending on the status of the printer engaged in the printing service, such as the permitted number of sheets stored in the memory card. In this regard, there has been desired a technology to inform users, who use the printing service, of appropriate information according to the status of the printing service.

According to aspects of the present disclosure, there is provide a recording device including a recording engine configured to perform recording on a recording medium, a short-range wireless communication interface capable of performing a short-range wireless communication, and a controller. The recording device can provide a recording service of performing a recording operation by the recording by an amount within a record permission amount, the record permission amount being an amount that recording by the recording engine is permitted. Further, the controller is configured such that, in response to performing the short-range wireless communication between the short-range wireless communication interface and a terminal device, the controller performs transmitting notification information corresponding to a status, regarding the recording service, of the recording device itself to the terminal device via the short-range wireless communication.

BRIEF DESCRIPTION OF THE DRAWINGS

FIG. 2 shows an example of a printer management table shown in FIG. 1.

FIG. 3 shows an example of a sever management table shown in FIG. 1.

FIGS. 8A-8D show transition of a screen to be displayed on a portable terminal device when an authentication performed by a user IF of the printer.

FIGS. 9A-9F are a sequence diagram illustrating transition of a charging page and a replacement requesting page.

DETAILED DESCRIPTION OF THE EMBODIMENTS

Configuration of Printing System 1

Figure 1:
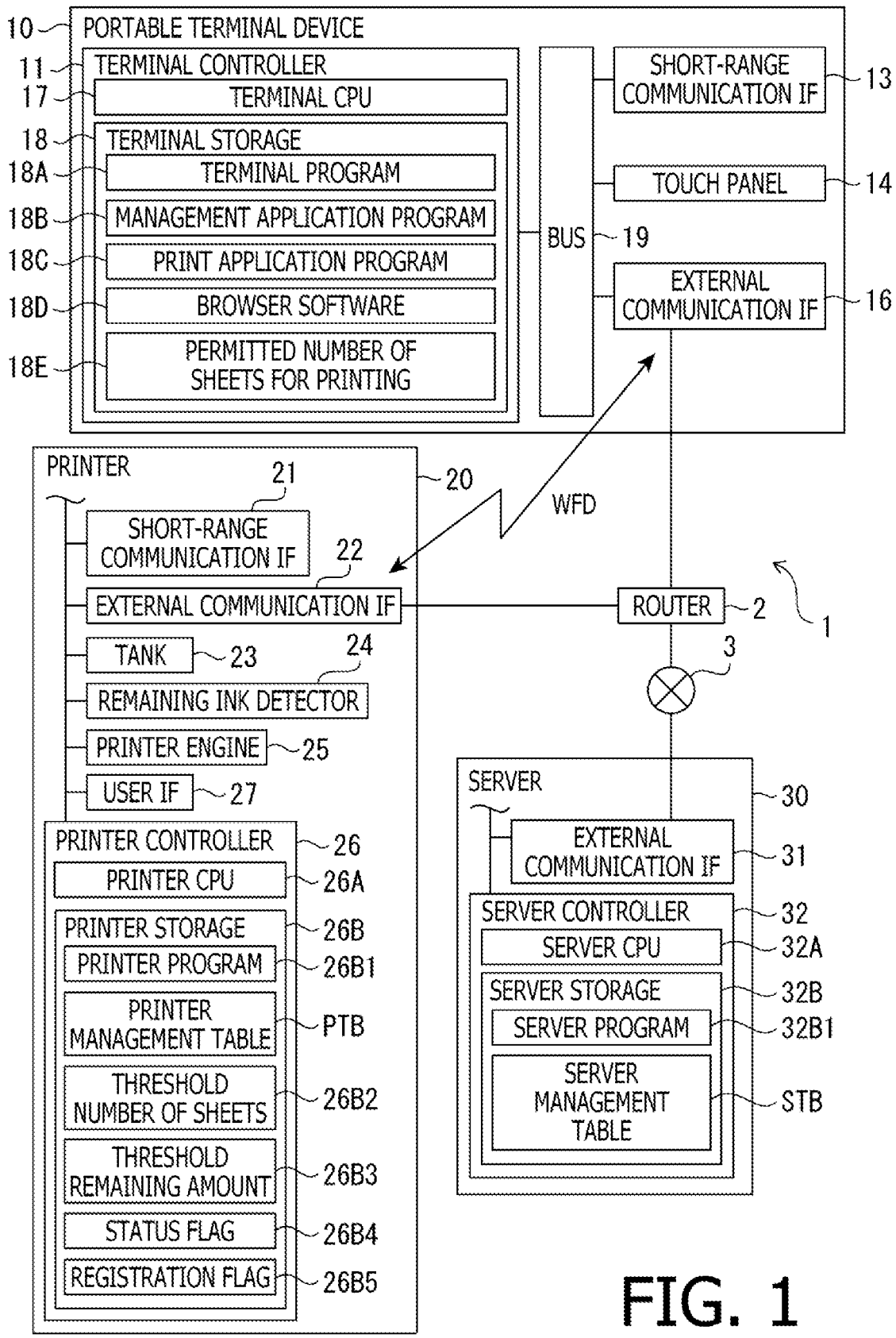
FIG. 1 is a block diagram illustrating a configuration of a printing system according to an embodiment.

A printing system 1 according to an embodiment of the present disclosures will be described with reference to the accompanying drawings. FIG. 1 is a block diagram showing a configuration of the printing system 1. The printing system 1 has, for example, a plurality of printers 20 and a mobile terminal device 10, and is configured to provide printing services to users. According to the present embodiment, the printing service is a service that enables a user to print by charging the user for the permitted number of sheets, which is the number of sheets that can be used for printing by the printer 20. For example, by paying an initial fee when a user applies for this printing service, a particular number of sheets (e.g., 2000 sheets) is granted for the user as the permitted number of sheets. In the following explanation, setting the permitted number of sheets or increasing the permitted number of sheets by charging additionally may occasionally be referred to as "charging."

In the present embodiment, the printer 20 is an inkjet printer. The printer 20 shipped from a vender to the user is filled with a sufficient amount of ink to print more than the particular number of sheets (e.g., 2000 sheets plus something extra). Therefore, in the printing service, after the user has received the printer 20, the user does not need to fill the printer 20 with ink or replace the ink cartridge until the user prints the permitted number of sheets granted by paying the initial fee. Therefore, the printing service is a highly convenient service for the user.

When the user wants to print more than the particular number of sheets granted by the payment of the initial fee, the user pays an additional fee to purchase additional permitted number. Then, the user can continue to use the printer 20. When the remaining ink level of the printer 20 becomes low as the user repeatedly purchases the additional permitted number by repeatedly paying the initial fee, the user can apply for replacement of the printer 20. As the printer 20 is replaced in response to the request, the printing service can be continued.

As shown in FIG. 1, the printing system 1 includes a mobile terminal device 10, a printer 20, and a server 3. It is noted that FIG. 1 shows only one mobile terminal device 10 and one printer 20 to avoid complication of the drawing. However, as mentioned above, the printing system 1 may be configured to include multiple mobile terminal devices 10 and/or a plurality of printers 20. The portable terminal device 10 and the printer 20 are connected to each other through a router 2 so that mutual communication is enabled therebetween. Further, the portable terminal device 10 and the printer 20 are connected to the server 30 via the router 2 and the Internet 3 so as to communicate with each other.

It should be noted that the configuration of the network described above is only an example and can be modified in various ways. For example, the server 30 may be included in a LAN, and the mobile terminal device 10 and printer 20 are connected to the server 30 without going through the Internet 3. Further, one or more portable terminal devices 10 and one or more printers 20 may be connected to the server 30. In addition, a single printer 20 may be shared and used by multiple mobile terminal devices 10. Alternatively, a single mobile terminal device 10 may use multiple printers 20.

Configuration of Mobile Terminal Device 10

The portable terminal device 10 is configured to cause the printer 20 to print images on a printing sheet. The portable terminal device 10 is, for example, a smartphone. The portable terminal device 10 is equipped with a terminal controller 11, a short-range communication IF ("IF" being an abbreviation of "interface") 13, a touchscreen panel 14, and an external communication IF 16, which are configured to communicate with each other via a bus 19.

The terminal controller 11 has a terminal CPU 17 and a terminal storage 18. The terminal storage 18 includes a combination of, for example, a RAM, a ROM, and a flash memory. The terminal storage 18 contains a terminal program 18A, a management application program (hereinafter, the "application program" will be simply referred to as "application") 18B, a printing application 18C, browser software (hereinafter referred to as "browser") 18D, and a permitted number 18E of sheets on which printing can be performed. The terminal program 18A, the management application 18B, the printing application 18C, the browser software 18D, and the permitted number 18E are stored, for example, in a rewritable ROM (e.g., a flash memory, an SSD or the like). The terminal program 18A is a program that integrally controls the portable terminal device 10, and includes the management application 18B, which provides basic functions and services to the management application 18B, the printing application 18C and the browser software 18D. The terminal program 18A is, for example, Android (registered trademark) OS or iOS (registered trademark). When the portable terminal device 10 is a PC, the terminal program 18A may be Windows (registered trademark) OS.

The management application 18B and the printing application 18C are programs provided, for example, by the vender of the printer 20, and are configured to perform various processes for the printer 20 using functions of the terminal program 18A and the like. The management application 18B is a program configured to execute, for example, an instruction to register the printer 20 with the server 30, a charge instruction to set or increase the permitted number 18E which is set to the server 30 in accordance with the fee paid by the user. The printing application 18C is configured to execute setting instructions and printing instructions for the printer 20. It is noted that the management application 18B and the printing application 18C may be combined as a single application.

The terminal controller 11 executes the terminal program 18A, the management application 18B and the printing application 18C on the terminal CPU 17, thereby integrally controlling the portable terminal device 10. The browser software 18D is software that displays web pages of a web server, and, for example, Safari (registered trademark), Microsoft Edge (registered trademark), Microsoft Edge (registered trademark), Google Chrome (registered trademark), Firefox (registered trademark), and the like are known. According to the present embodiment, the browser software 18D is used to display the web pages of the server 30. The permitted number 18E of the printing sheets is the information stored on the mobile terminal device 10 and represents the permitted number of sheets used for printing by the printer 20 (see FIG. 2). The mobile terminal device 10 is configured to display the current permitted number 18E on the touchscreen panel 14 for receiving a print instruction to the printer 20.

In the following explanations, the terminal controller 11 which executes the terminal program 18A, the management application 18B, the printing application 18C and the browser software 18D may be simply referred to by the name of the device. That is, a statement that "the portable terminal device 10 does . . . " may be intended to mean that "the terminal controller 11 that executes the terminal program 18A, the management application 18B, the printing application 18C and the browser software 18D on the CPU 17 does . . . ." Further, in the specification, the processes of the terminal CPU 17 according to the instructions described in the program will be illustrated. That is, "determination," "transmission," and other processes in the following description represent the processes of the terminal CPU 17. It is noted that the processes by the terminal CPU 17 includes hardware control. Similarly, a printer controller 26 executing a printer program 26B1 with a printer CPU 26A may be expressed as "the printer 20 does . . . ," and a server controller 32 executing a server program 32B1 with a server CPU 32A may be expressed as "the server 30 does . . . ." In addition, "data" in this specification is represented by a computer-readable bit string, and data having the same substantive meaning content but different formats is treated as the same data. The same applies to "information" in this specification.

The terminal storage 18, in which programs (e.g., the terminal program 18A, the management application 18B, the printing application 18C, and the browser software 18D) are stored, may be a computer-readable storage medium. The computer-readable storage medium is a non-transitory medium. The non-transitory medium includes, in addition to the above examples, recording media such as a CD-ROM and a DVD-ROM. It is noted that the non-transitory medium is also a tangible medium. On the other hand, an electrical signal carrying a program that is downloaded from a server on the Internet or the like is a signal medium, which is a kind of computer-readable medium, but not included in the non-transitory medium. In addition, the printer storage 26B, in which a printer program 26B1 (described later) is stored, and a server storage 32B1, in which a server program 32B1 is stored, may also be the computer-readable storage media which are the non-transitory media.

The short-range communication IF 13 is a communication interface capable of performing a short-range wireless communication according to the NFC (Near Field Communication) standard. It should be noted that the short-range wireless communication performed by the short-range communication IF 13 is not limited to that compliant to the NFC standard, but the short-range communication according to other communication standards such as Bluetooth (registered trademark). The touchscreen panel 14 has a liquid crystal panel and a contact sensing film attached onto the surface of the liquid crystal panel, and changes display contents on the liquid crystal panel according to the control of the terminal controller 11. In addition, the touchscreen panel 14 is configured to receive a user's operation input, and outputs signals corresponding to the operation input to the terminal controller 11. It is noted that the portable terminal device 10 may have operation buttons such as a power button and the like in addition to the touchscreen panel 14. It is noted that the user interface equipped to the portable terminal device 10 is not necessarily limited to the touchscreen panel 14. That is, the portable terminal device 10 may further have a display device such as an LCD or an organic electroluminescent display, and input devices such as a pushbutton switch, a slide switch and the like.

The external communication IF 16 is a communication interface capable of performing a wireless communication compliant, for example, to the Wi-Fi (registered trademark) communication standard. The portable terminal device 10 is connected to a router 2 via the external communication IF 16. The router 2 is connected to the server 30 via the Internet 3. It is noted that, instead of or in addition to the wireless communication interface, the external communication section 16 may be equipped with a wired communication interface to which a cable such as a LAN cable is connectable.

Configuration of Printer 20

The printer 20 is a color printing device configured to perform printing on a printing sheet (which is an example of a recording medium) in accordance with, for example, the inkjet printing method. The printer 20 is equipped with the short-range communication IF ("IF" being an abbreviation of "IF") 21, an external communication IF 22, a tank 23, a remaining ink detector 24, a print engine 25, a user IF 27, and the printer controller 26. The short-range communication IF 21 is a communication IF capable of performing the short-distance wireless communication in accordance with, for example, the NFC standard. It should be noted that the short-distance wireless communication performed by the short-range communication IF 21 is not necessarily limited to the NFC, but another short-range communication in accordance with, for example, Bluetooth (registered trademark). The printer 20 is configured to communicate with the short-range communication IF 13 via the short-range communication IF 21. The printer 20 is configured to communicate with the short-range communication IF 13 via the short-range communication IF 21, and obtain setting information and printing instructions from the portable terminal device 10. It is noted that the terms "obtain" and "acquire" in this specification are used in a concept that does not require a request. That is, a process of receiving an instruction or information from the printer 20 without requesting for such an instruction or information is included in the concept of "acquiring" or "obtaining" an instruction or information from the printer 20.

The external communication IF 22 has, for example, a communication interface configured to perform a wireless communication in accordance with the Wi-Fi (registered trademark) communication standard, and a wired communication interface configured to connect to a LAN cable. The printer 20 is connected to the router 2 via the external communication IF 22. It is noted that the external communication IF 22 may be configured with only one of the wireless communication interface or the wired communication interface.

The tank 23 is a device in which ink is stored. In the present embodiment, there are four kinds (i.e., magenta abbreviated as M, cyan abbreviated as C, yellow abbreviated as Y, and black abbreviated BK) of inks, and a plurality of tanks 23 are provided for respective kinds of the inks. In other words, the printer 20 uses a plurality of tanks 23 in which the four kinds of inks are stored respectively and independently. The printer 20 may be a printer configured to perform monochromatic printing. In such a case, the tank may be configured to store only one kind of (i.e., one color of) ink. In the present embodiment, when the printer 20 is supplied from the vender to the user, each of the plural tanks 23 is filled with the ink enabling printing of a particular number of sheets when, for example, a single color coverage is regarded as 5%. The particular number is the number greater than a printable number assigned to the user who has applied for the printing service, and the particular number can be set arbitrarily by the vender who provides the printing service.

The tank 23 is provided such that the tank 23 cannot be filled with ink by the user. Concretely, the tank 23 is arranged at a position where the user cannot touch the tank 23. Further, the tank 23 is fixed to the printer 20 such that the user cannot detach or attach the tank 23 from/to the printer 20. The remaining ink detector 24 is configured to detect the remaining amount of the ink (i.e., the amount of the ink remained in the tank 23). The remaining ink detector 24 is an optical sensor, which arranged at the tank 23 to detect the height of the surface of the ink stored in the tank 23. It is noted that the remaining ink detector 24 is provided to each tank 23 to detect the remaining amount of the ink in each tank 23. It is noted that the printer 20 may be configured such that the user can replace the tank 23.

The print engine 25 is configured to perform printing using the ink stored in the tank 23. The print engine 25 is provided with, for example, an inkjet head and perform printing, in accordance with the well-known inkjet printing method, based on image data included in a print instruction obtained from the portable terminal device 10. The user IF 27 includes, for example, a touchscreen panel, a power button and the like which function to receive operation inputs by the user and/or display various pieces of information. It is noted that the printer 20 may be configured such that some members of the user IF 27 (e.g., the touchscreen panel and the like) are not provided.

The printer controller 26 is configured to integrally control the printer 20. The printer controller is equipped with a printer CPU 26A and a printer storage 26B. The printer CPU 26A controls operations of the printer by executing the printer program 26B1 stored in the printer storage 26B. The printer program 26B1 is a program configured to integrally control the printer 20, and cause, when executed, the printer 20 to perform various processes. The printer storage 26B is configured, for example, by combining a RAM, a ROM, a flash memory, and an HDD. The printer program 26B1 is stored in a rewritable ROM (e.g., a flash memory) of the printer storage 26B.

In the printer storage 26B, a printer management table PTB is stored. The printer management table PTB is stored, for example, in a rewritable ROM. The printer management table PTB is data in which information about the printer 20 is stored with respect to the use of the printing service. As shown in FIG. 2, the printer management table PTB stores a device ID, the permitted number of sheets for which printing can be performed, an amount of remaining ink, and the device settings in an associated manner. The device ID is, for example, a serial number set by the vender of the printer 20, and is unique information that can identify a given printer 20 from other printers 20. The device ID is not necessarily limited to the serial number, but can be other information such as the MAC address of the short-range communication IF 21 or the external communication unit 22.

The permitted number of sheets indicates the printable number of sheets by the printer 20. The user who uses the printer 20 is permitted to perform printing within a range of the permitted number of sheets which is stored in the printer management table PTB. The permitted number of sheets can be increased (i.e., charged) by an amount corresponding to the amount fees charged to the user. It is noted that the permitted number of sheets is decremented by the number of sheets used as the printing by the printer 20 is performed. When, for example, the permitted number of sheets becomes zero or less, the printer 20 is unable to perform printing. The printer 20 executes printing each time a print instruction is received, subtracts the number of printed sheets from the permitted number of sheets, and keep printing until the permitted number of sheets becomes zero. When the permitted number of sheets reaches zero, the printer 20 prohibits printing and notifies the portable terminal device 10 of an occurrence of an error. When the number of sheets to be printed instructed by the print instruction is more than the permitted number of sheets when the printer 20 receives the print instruction, the printer 20 may notify the portable terminal device 10 of the error without performing the printing, but storing the number of sheets that can be printed.

The ink remaining amount indicates the remaining amount of the ink detected by the remaining ink detector 24. After performing operations to use the ink (e.g., refilling of the ink to the inkjet head, checking of nozzles of the inkjet head, printing), the ink remaining amount detected by the remaining ink detector 24 is stored in the printer management table PTB. The device setting is setting information of functions (e.g., the print function) of the printer 20, various functional settings (e.g., a sheet size, a color setting, a magnification setting) and language to be used to display information on the user interface 27.

The contents of the printer management table PTB shown in FIG. 2 are examples. The printer management table PTB may contain activation information to be managed by the server 30. The activation information here means, for example, information that allows the print engine 25 to perform printing when set to the "on" state by the server 30, while restricts the print engine 25 to perform printing when set to the "off" state. By setting the state of the activation information, the server 30 can control the printing processes of the multiple printers 20, respectively.

In addition, a threshold number of sheets 26B2, a remaining amount threshold 26B3, a status flag 26B4, and a registration flag 26B5 are stored in a rewritable ROM of the printer storage 26B. The threshold number of sheets 26B2 is a value used to determine the printable number of sheets in the printer management table PTB, that is, the remaining number of sheets of the permitted number of sheets used for printing by the printer 20 itself. In a state where the permitted number of sheets is less than the threshold number off sheet 26B2, if the short-range wireless communication in accordance with the NFC method (hereinafter, occasionally referred to as an "NFC communication") is started, the printer 20 notifies the portable terminal device 10 of a URL of a Web page for "charging" (i.e., enabling the user to increase the permitted number of sheets by paying additional fee) so that the Web page (hereinafter, occasionally referred to as "charging page") is displayed by the portable terminal device 10.

The printer 20 is configured such that, an initial value of the threshold number of sheets 26B2 has been set by the vender, and the value of the threshold number of sheets 26B2 can be changed based on an instruction by the user. A method of receiving an instruction from the user to change the threshold number of sheets 26B2 is not particularly limited. Such a change instruction may be received from the user IF 27 to which the user operation is input, or through the management application 18B of the portable terminal device 10 to which the change operation by the user is input. By changing the threshold number of sheets 26B2, the user can change a timing of receiving the charge page notification to a desired timing. It is noted that the printer 20 may be configured such that the threshold number of sheets 26B2 set by the vender cannot be changed. Further, the printer 20 may be configured such that, when the permitted number of sheets becomes less than the threshold number of sheets 26B2, the printer 20 may transmit a notification to push the user to pay additional fees (i.e., charge) to the portable terminal device 10.

The threshold remaining amount 26B3 is a value used to determine the remaining amount of the ink in the printer management table PTB, that is, the remaining amount of the ink in the printer 20 itself. The threshold remaining amount 26B3 is a value used to in a state where the ink remaining amount becomes less than the threshold remaining amount 26B3, the printer 20 starts NFC communication, and notifies the portable terminal device 10 of a web page through which the user can apply for replacement of the printer 20 (hereinafter the web page will be referred to as a "replacement request page") to cause the portable terminal device 10 to display the replacement request page. The user can use this replacement request page to request shipment of the printer 20 for replacement.

The threshold remaining amount 26B3 is set to a value such that a period from a time when the replacement request page is notified to the user based on the threshold remaining amount 26B3 to a time when the printer 20 for replacement is delivered to the user is shorter, compared to a period from a time when it is determined that the ink remaining amount less than the threshold remaining amount 26B3 to a time when the ink is expected to run out due to execution of printing.

For example, the threshold remaining amount 26B3 is set to a value equal to or larger than a value calculated by multiplying the average number of days necessary for delivering the printer 20 by an average value of an ink usage amount per day. The average value of the ink usage per day can be calculated from the ink remaining amounts of the multiple printers 20 registered in the server management table STB of the server 30. Alternatively, the printer 20 may calculate and use the average value of the usage amount of ink per day after the printer 20 has started to be used.

When the printer 20 is configured such that the tank 23 is replaceable, the printer 20 may be configured to transmit a replacement request page to the portable terminal device 10 to request replacement of the tank 23 when the ink remaining amount becomes equal to or less than the threshold remaining amount 26B3. Accordingly, "replacement of the reservoir" according to aspects of the present specification is a concept that includes replacement of the printer 20 itself and replacement of only the reservoir that contains the colorant (e.g., ink) to be used by the printer 20.

The status flag 26B4 is information used to determine the status of the printer 20. As described later, the printer 20 changes the status flag 26B4 according to the permitted number of sheets on which printing can be performed, the ink remaining amount, and the like. When the printer 20 starts the NFC communication, the printer transmits a notification according to the status flag 26B4 to the portable terminal device 10. The registration flag 26B5 is information indicating whether or not the information of the printer 20 itself has been registered in the server management table STB of the server 30. In the initial state in which the printer is shipped from the vender, a value indicating that the printer has not been registered (e.g., zero) is set to the registration flag 26B5 of the printer storage 26B. When the printer 20 performs the registration process (S49 in FIG. 6) to register the printer 20 with the server 30, the printer 20 updates the value of the registration flag 26B5 from the value indicating an unregistered state (e.g., zero) to a value indicating a registered state (e.g., 1). The details of the status flag 26B4 and the registration flag 26B5 will be described later.

Configuration of Server 30

As shown in FIG. 1, the server 30 is equipped with an external communication IF 31 and a server controller 32. The external communication IF 31 is configured to execute a communication with the portable terminal devices 10 and the printers 20 connected via the Internet 3. The server controller 32 is equipped with a server CPU 32A and a server storage 32B. The server controller 32 is equipped with a server CPU 32A and a server memory 32B. The server CPU 32A executes a server program 32B1 in the server storage 32B to integrally control operations of the server 30. The server program 32B1 is a program that integrally controls the server 30, and is configured to cause the server 30 to execute various processes.

The server storage 32B has a combination of a RAM, a ROM, a flash memory, an HDD, and the like. The server management table STB is stored in the server storage 32B. The server management table STB is data containing information necessary for using the printing service. In the server management table STB, the information of the printers 20 that use the printing service is stored in association with device IDs of the respective printers 20, and is managed by the vender.

As shown in FIG. 3, in the server management table STB, the device ID, the permitted number of sheets on which printing can be performed, and the ink remaining amount. It is noted that the device ID, the permitted number of sheets, and the ink remaining amount are the same data as in the printer management table PTB described above. Therefore, the data of the printer management table PTB corresponding to the same device ID is stored as the server management table STB. The server 30 according to the present embodiment is configured to manage the permitted number of sheets printable by each printer 20 by means of the server management table STB in which the device IDs and the permitted numbers of sheets are associated for the multiple printers 20. The server 30 performs a process of synchronizing the permitted number of sheets, which increases or decreases in response to the printing or charging instructions from the portable terminal device 10, with the printer 20, and manages the latest permitted number of sheets with use of the server management table STB. In addition, the server 30 collects the latest information on the ink remaining amount from the printer 20 by performing the synchronization process. The server 30 may, for example, notify the portable terminal device 10 to replace the printer 20 when the ink remaining amount falls below a particular threshold. According to such a configuration, the user is enabled to apply for the replacement of the printer 20 and receive a new printer 20 before the ink remaining amount of the printer 20 in use runs out and printing becomes impossible.

Status Flag Setting Process

Next, a status flag setting process executed by the printer 20 will be explained with reference to FIG. 4. The printer 20 changes the value of the status flag 26B4 by executing the status flag setting process shown in FIG. 4. For example, the status flag 26B4 is set to an initial value and five different values (e.g., values 00, 01, 02, 03, 04, and 05) corresponding to S5 to S9 ("S" being an abbreviation of "step") shown in FIG. 4. In the initial state when the printer is shipped from a vender, the status flag 26B4 of the printer storage 26B is set to an initial value "00."

Figure 4:
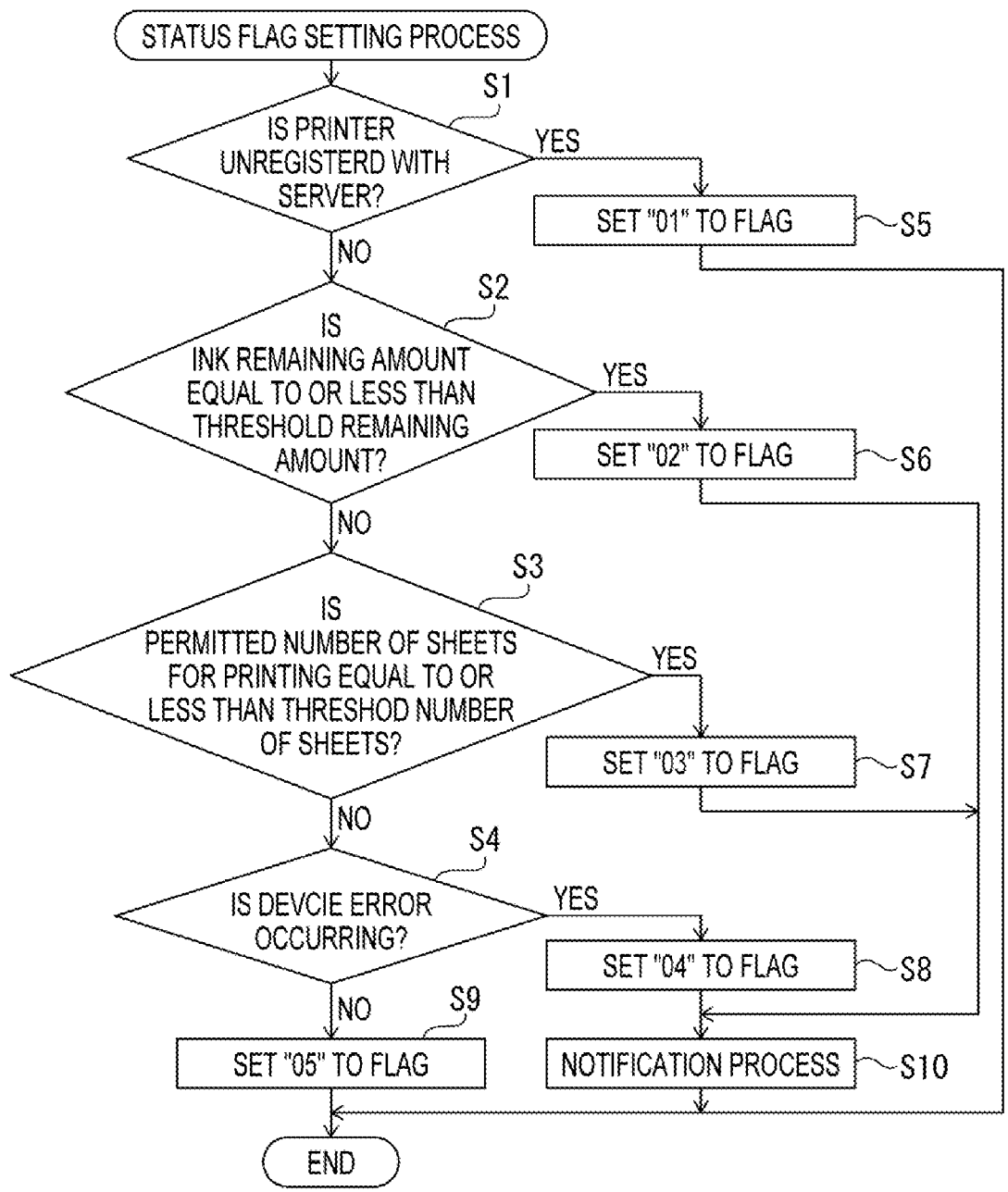
FIG. 4 is a flowchart illustrating a status flag setting process executed by a printer.

When the process of FIG. 4 is started, the printer 20 determines whether the printer 20 itself is unregistered with the server 30 (S1). For example, the printer 20 determines whether the printer 20 itself is unregistered based on the registration flag 26B5 of the printer storage 26B. When the registration flag 26B5 has a value indicating that the printer 20 is unregistered (S1: YES), the printer 20 executes S5. In S5, the printer 20 sets a value "01" to the status flag 26B4 and terminates the process shown in FIG. 4. In a state where the value "01" is set to the status flag 26B4, as will be described in detail later, when the NFC communication with the portable terminal device 10 is started, the printer 20 starts a communication in accordance with the Wi-Fi Direct (registered trademark) communication, and prompts registration of the printer 20 using the management application 18B.

When the registration flag 26B5 has a value indicating that registration has been completed (S1: NO), the printer 20 executes S2. In S2, the printer 20 determines whether the ink remaining amount is less than or equal to the threshold remaining amount 26B3. When the remaining ink amount in the printer management table PTB is less than or equal to the threshold remaining amount 26B3 (S2: YES), the printer 20 executes S6. Alternatively, at a time when executing S2, the printer 20 may detect the latest ink remaining amount using the remaining ink detector 24 and used the detection result for determination in S2. In S6, the printer 20 sets a value "02" to the status flag 2B4 and terminates the process shown in FIG. 4. In a state where the value "02" is set to the registration flag 26B5, when the NFC communication with the portable terminal device 10 is started, the printer 20 causes the portable terminal device 10 to display the replacement request page 105 (see FIG. 9E) of the server 30.

After executing S6, the printer 20 executes a notifying process (S10). When S6 is executed, the ink remaining amount is low, and the printer 20 is in a state that it is better to prompt the user for a replacement request via the NFC communication. Accordingly, after execution of S6, the printer 20 executes a notification process to prompt the user to execute the NFC communication (i.e., a touch operation) (S10). For example, the printer 20 may transmit a message such as "please perform a touch operation," "please perform the replacement request to request the replacement of the printer 20 by the touch operation using the NFC." After executing S10, the printer 20 terminates the process shown in FIG. 4.

When the ink remaining amount is larger than the threshold remaining amount 26B3 (S2: NO), the printer 20 executes S3. In S3, the printer 20 determines whether the permitted number of sheets is equal to or less than the threshold number of sheets. When the permitted number of sheets in the printer management table PTB is equal to or less than the threshold number of sheets 26B2 (S3: YES), the printer 20 executes S7. In S7, the printer 20 sets a value "03" to the status flag 26B4. In a status where the value "03" is set to the status flag 26B4, when the NFC communication with the portable terminal device 10 is started, the printer 20 cause the portable terminal device 10 to display the charge page 91 (see FIG. 9B) of the server 30. When S7 is executed, the printer executes the notification process (S10). It is noted that, when S7 is executed, as in S6, the permitted number of sheets becomes low, and it is preferable that the printer 20 prompt the user, via the NFC communication, to perform a charging operation (e.g., to pay additional fee to increase the permitted number of sheets). Accordingly, the printer 20 displays messages such as "please perform charging for the permitted number of sheets by the NFC touching" and the like.

When the permitted number of sheets is larger than the threshold number of sheets 26B2 (S3: NO), the printer 20 determines whether a device error is occurring (S4). When it is determined that the device error is occurring (S4: YES), the printer 20 sets a value "04" to the status flag 26B4 (S8). In a status where the value "04" is set to the status flag 26B4, when the NFC communication with the portable terminal device 10 is started, the printer 20 notifies, for example, a support page corresponding to the occurring device error to the portable terminal device 10. The support page is, for example, a web page in which a method of resolving the device error is described, which may be a web page of the server 30 or another web page prepared by the vender of the printer 20.

The device errors determined to be affirmative in S4 (i.e., subjected to be notified) may include, for example, all the errors for which the resolving methods are described on the website of the vender of the printer 20, or only errors which are difficult to resolve and require that manuals or drawings should be referred to for resolving. For example, the printer 20 may determine that no error is occurring (S4: NO) when simple errors (e.g., running short of sheets) is occurring, while notifying the user IF 27 of the shortage of the sheets. On the other hand, for errors difficult to be resolved and requiring reference to manuals, it is preferable that the printer determines that error is occurring (S4: YES) and notifies the support page to the portable terminal device 10. It is noted that the printer 20 may be configured to notify the portable terminal device 10 of the URL of the support page, or transmit the URL with an error code being embedded in the URL. When the error code is embedded in the URL, the web server may refer to the error code in the URL accessed by the portable terminal device 10 and display (e.g., redirect) a support page corresponding to the error code.

When S8 is executed, the printer 20 executes the notification process (S10) in the same way as in S6 and S7. For example, the printer 20 displays a message on the user IF 27 such as "an error has occurred, please check the error details by NFC touch" on the user IF 27. The printer 20 does not need to display the message on the user IF27 in S10. For example, the printer is equipped with a lamp to encourage the user to perform the NFC communication, and may light this lamp to encourage the execution of the NFC communication when any of S6, S7, or S8 is executed. In other words, a common process may be executed as a notification process. In addition, the printer 20 may not need to execute the notification process of S10. Further, when executing S5 or S9 described later, the printer 20 may also execute the notification process of S10.

The printer 20 may terminate the notification process of S10 in response to a particular condition being met. For example, the printer 20 may terminate the notification process in response to detection of start of the NFC communication after a notification is made in S10. That is, after the notification (S10), the notification process may be terminated when the NFC communication is performed once. Alternatively, the printer 20 may terminate the notification process when the notified content (i.e., the error) is resolved. For example when S10 is executed after execution of S6, the printer 20 may terminate the notification process when there is an access to the replacement request page or the replacement request has been made. Alternatively, the printer 20 may terminate the notification process after elapse of a particular fixed time period.

When it is determined that the device error is not occurring (S4: NO), the printer 20 sets a value "05" to the status flag 26B4 (S9) and terminates the process shown in FIG. 4. In a state where the value "05" is set to the status flag 26B4, when the NFC communication with the portable terminal device 10 is started, the printer 20 transmits an instruction to start the printing application 18C.

As described above, the printer changes the status flag 26B4 in accordance with the determination results in S1-S4, the printer 20 changes the notification to the portable terminal device 10. In other words, when there is a possibility that the determination results in S1-S4 change, the printer 20 needs to execute the process shown in FIG. 4. Therefore, as a start condition to start the process shown in FIG. 4, a condition to terminate the registration process of the printer 20 determined in S1 can be employed. Further, as the start condition, a condition in which the ink remaining amount determined in S2 is decreased, concretely, a condition to start printing, a condition to use the ink in the nozzle check of the print engine 25 can be employed. Furthermore, as the start condition, a condition in which the permitted number of sheets determined in S3 is increased/decreased, concretely, the permitted number of sheets is decremented by execution of printing, a condition in which the permitted number of sheets is incremented by charging can be employed. Furthermore, a condition in which the device errors determined in S4 occur can be employed. Alternatively, the start condition may be a condition in which a fixed time period elapses after the process of FIG. 4 was executed previously. Still further, the start condition is a condition in which the printer 20 is powered on, a condition in which an execution instruction is obtained from the portable terminal device. According to the above, the change flag 26B4 can be changed depending on the status of the printer 20 before starting the NFC communication with the portable terminal device 10. It is noted that the printer 20 may execute the process of FIG. 4 before starting the NFC communication with the portable terminal device 10, for example, before S19 of FIG. 5 which will be described later.

Wireless Controlling Process

Next, as an example of a process executed when the status flag 26B4 is "01" (S5 of FIG. 4), a wireless controlling process shown in FIG. 5 will be described. When, for example, the user bought the printer 20 first time, and the printer 20 has arrived from the vender, the printer 20 performs the processes shown in FIG. 5. The portable terminal device 10, the printer 20, and the server 30 execute respective processes based on operations of the user. In the sequence diagrams in FIG. 4 onward, operations by the user are indicated by obliquely downward arrows. Further, the order and the order and the contents of the processes and/or operations on FIG. 4 onward are only examples. In the following description, a case where the printer 20 of which device ID is "dv1" (see FIG. 2) is used will be described.

Initially, the user powers on the printer 20 (S11 of FIG. 4). When the printer 20 is powered on, the printer 20 executes the printer program 26B1 with the printer CPU 26A and invokes the system of the printer 20 (S13). Further, when the system is invoked, the printer 20 activates the function of the NFC communication (S13). Accordingly, the printer 20 becomes capable of performing the NFC communication with the portable terminal device 10. It is noted that the printer 20 may be configured such that the NFC communication function is not activated until the printer 20 receives a user operation therefor.

The printer 20 generates a printer one time token PWT (S13). As will be described later, the printer 20 and the server 30 according to the present embodiment are configured to generate a token as information used to identify a communication destination (e.g., the portable terminal device 10). As the token, a character string which is a combination of numerals and alphabets may be employed. The printer 20 and the server 30 can suppress an occurrence of spoofing, data leakage, and data tampering by transmitting the token to the communication destination, and thereafter, performing an authentication using the token transmitted in the communication with the communication destination. For example, the communication destination which has received the token from the printer 20 or the like attaches the token to data when the communication destination transmits the data to the printer 20 or the server 30, thereby proving that the communication destination is the device which has received the token. The printer 20 or the like determines that the communication destination is the authenticated device when the token received from the communication destination coincides with the token the printer 20 or the like has.

It is noted that the printer 20 or the server 30 may not need to generate the token every time when the token becomes necessary. For example, the printer 20 or the server 30 may generate multiple tokens in accordance with the number of communication destinations in advance, and selects a token to be used from among the tokens having been generated. In other words, the printer 20 or the server 30 may not generate a token every time when it becomes necessary, but performs a setting process to select a token from among the tokens having been generated in advance and associates the selected token with the communication destination. Further, how to use the token is not necessarily limited to a method of examining coincidence of the tokens described above. The printer 20 or the like may be configured to determine that the authentication is successful even if the character strings of the tokens do not match perfectly, for example, even if there are differences in uppercase and lowercase letters. Alternatively, the printer 20 or the like may determine that the authentication is successful when the hash value generated based on the authentication information obtained from the communication destination matches the hash value held by the printer 20 itself. Further alternatively, the printer 20 or the like may also perform encryption of data using the token and determine that the communication destination has been successfully authenticated based on the fact that the data has been successfully decrypted.

The one-time token, for example, has a relatively short validity period compared to a token, and is used to authenticate the communicating destination in the communication before the token is generated. By shortening the validity period of the one-time token, even if the number of characters in the one-time token is shortened, the security level can be maintained since the opportunity (time to attempt) for authentication through the generation of illegal tokens such as random or brute force. The printer 20 can, for example, update the printer one-time token PWT to be used every particular time (e.g., one hour) to ensure that the valid printer one-time token PWT is changed (S13).

After executing S13, the printer 20 executes a status flag setting process shown in FIG. 4 (S14). As described above, the status flag 26B4 is set to the initial value "00" when the printer is shipped from the vender to the user. Further, the registration flag 26B5 is initially set to a value indicating unregistered status. Therefore, in S14, the printer 20 sets the status flag 26B4 to the initial value "00" to "01" (S1: YES, S5 in FIG. 4).

On the other hand, the user performs setting of the portable terminal device 10 (S15). For example, the user enters an SSID and an encryption key of the router 2 by operating the touchscreen panel 14 to connect the external communication IF 16 of the portable terminal device 10 and the router 2 with the Wi-Fi (registered trademark) (S15). The user operates the touchscreen panel 14 to install the management application 18B and the printing application 18C (S15). As the management application 18B and the printing application 18C are installed in the portable terminal device 10, the NFC communication function using the management application 18B and/or the printing application 18C is activated. It should be noted that the portable terminal device 10 may be configured such that the NFC communication function is not automatically activated, but kept deactivated until receiving the user operation for activation.

After installing the management application 18B and the like, the user performs a touch operation, which is an operation of bringing the short-range communication IF 13 of the portable terminal device 10 close to the short-range communication IF 21 of the printer 20 (S17). On the other hand, on the printer 20 side, when the NFC communication function is activated in S13, the printer 20 transmits radio waves (or generates magnetic fields) from the short-range communication IF 13 to perform polling. When receiving the radio waves from the printer 20 (or when an induced current flows due to electromagnetic induction), the portable terminal device 10 transmits a start notification to start the NFC communication to the printer 20 (S18). The portable terminal device 10 transmits, for example, in the starting notification, information necessary for the NFC communication (e.g., NFCID and the like) to the printer 20.

When the printer 20 obtains the start notification output in S18 and detects that the wireless terminal capable of performing the NFC communication is brought close to the short-range communication IF 21 by the touch operation, the printer checks the value of the status flag 26B4 (S19). Since the value "01" is set to the registration flag 26B5, the printer 20 transmits information prompting the installation and startup of the management application 18B and information on the registration instruction to instruct the management application 18B to register the printer 20 with the server 30 (S21).

When the portable terminal device 10 obtains, in S21, information instruction the startup of the management application 18, the portable terminal device 10 starts the management application 18B (S25). For example, the printer 20 transmits (S21) the application ID to the portable terminal device 10 as information instructing the startup, separately from the registration instruction. The application ID referred to here is information to identify an application used in Android (registered trademark) OS or iOS (registered trademark). More concretely, when the application is of Android (registered trademark) OS, the application ID is information which uniquely identifies an application (e.g., "com.example.xxx"). An application such as the management application 18B is uniquely identified by the application ID in a device (e.g., the portable terminal device 10) or an application distribution service (e.g., Play Store of Google Inc. or App Store of Apple).

By obtaining the application ID of the management application 18B in S21, if the management application 18B has already been installed, the portable terminal device 10 starts the management application 18B (S25). If the management application 18B has not yet installed, the portable terminal device 10 displays a message such as "do you want to install management application?" on the touchscreen panel 14. Alternatively, the portable terminal device 10 displays a web page such as a page of the App Store for installing the management application 18B on the touchscreen panel 14. It is noted that the information instructing the startup or the like of the management application 18B is not necessarily limited to the application ID described above. The information instructing the startup or the like may be, for example, a URL of a server of the vender of the printer 20, or a URL of a website of a distribution service of the management application 18B.

The printer 20 is configured to transmit Wi-Fi Direct authentication information and the printer one time token PWT generated in S13 to the portable terminal device 10 via the NFC communication in S21. The Wi-Fi Direction authentication information is authentication information to realize the wireless communication in accordance with the Wi-Fi Direction (registered trademark) (hereinafter, referred to as "WFD") method. The WFD method is a wireless communication method described in standardized document "Wi-Fi Peer-to-peer (P2P) Technical Specification Version 1.1" which is the method for performing the wireless communication in compliant to the IEEE 802.11 standard, and other similar standards (e.g., 802.11a, 802.11b, 802.11g, 802.11n and the like.)

After transmitting the SSID and the encryption key to the portable terminal device 10 as the WFD authentication information, the printer 20 starts up the WFD application software (S23) and cause the external communication IF 22 of the printer 20 itself to function as the access point (see FIG. 1). The WFD application is included, for example, in the printer program 26B1. When the printer 20 detects an access to the access point using the SSID and the encryption key transmitted in S21, the printer 20 performs a P2P communication with the communication destination via the wireless communication in accordance with the WFD method (hereinafter, occasionally referred to as "WFD communication").

When the portable terminal device 10 starts the management application 18B in S25, the portable terminal device 10 performs the WFD communication with the printer 20 via the management application 18B (S27). The portable terminal device 10 executes the process in S27 onward with the management application 18B. The portable terminal device 10 accesses from the external communication IF 16 to the external communication IF 22 (access point) of the printer 20 using the obtained SSID and the encryption key of the WFD obtained in S21 (S27). In this way, the external communication IF 16 of the portable terminal device 10 and the external communication IF 22 of the printer 20 are connected via the WFD communication.

Further, the portable terminal device 10 transmits the SSID and the encryption key of the router 2, that is, connection information to connect with the network to which the portable terminal device 10 itself is connected to the printer 20 (S27). When being accessed by the portable terminal device 10 via the WFD communication and obtaining the connection information of the router 2 (S27), the printer 20 terminates the WFD application (S29). In this way, the WFD communication between the portable terminal device 10 and the printer 20 are disconnected. Further, in S29, the printer 20 connects with the router 2 via the wireless communication according to the Wi-Fi (registered trademark) communication using the connection information (i.e., the SSID and the encryption key) obtained from the portable terminal device 10 in S27. Thus, the portable terminal device 10 and the printer 20 becomes communicable via the router 2. Further, the printer 20 becomes communicable with the server via the router 2.

Next, the portable terminal device 10 transmits a generating instruction of a printer token PT, via the Wi-Fi (registered trademark) method wireless communication (i.e., the router 2), under control by the management application 18B, to the printer 20 (S31). The portable terminal device 10 performs an authentication using the printer one time token PWT obtained in S21 in the communication with the printer 20 in S31. For example, the portable terminal device 10 transmits the printer one time token PWT by attaching the same to the transmission data to the printer 20. The printer 20 determines that the authentication is successful when the printer one time token PWT attached to the transmission data coincides with the printer one time token PWT generated by the printer 20 itself, and generates the printer token PT (S33).

The printer token PT is a token of which security is made higher by increasing the number of characters than the printer one time token PWT, and the information used for identify the portable terminal device 10. It is noted that the number of characters of the printer token PT may be the same as or less than that of the printer one time token PWT. The identification information of the portable terminal device 10 which is a transmission source of the generation instruction at S31, that is, the identification information of the portable terminal device 10 identified by the printer one time token PWT and the generated printer token PT are stored in the printer storage 26 GB in an associated manner. The printer 20 is configured to identify/authenticate the portable terminal device 10 which is the communication destination based on the above-described associated information in the subsequent processes. The identification information of the portable terminal device 10 is information used to identify a device (e.g., the ID of the management application 18B, the MAC address of the external communication IF 16).

Since the status of the printer 20 transits from a status to use the printer one time token PWT to a status to use the printer token PT as the token information between the printer 20 and the portable terminal device 10, the printer 20 generates the printer one time toke PWT again and update the same (S33). In this way, the printer 20 is in a status of not receiving the control instruction using the old printer one time token PWT. Further, when receiving an access from the portable terminal device 10 via the NFC communication, the printer 20 performs the communication using the updated printer one time toke PWT.

The printer 20 transmits the printer toke PT generated in S33 to the portable terminal device 10 (S35). The portable terminal device 10 and the printer 20 are configured to perform the authentication using the printer token PT in the communication via the router 2, and various processes. For example, the portable terminal device 10 and the printer 20 are configured to perform an initial setting process (S37 of FIG. 5) with respect to the printer 20 as shown in FIG. 6. That is, the portable terminal device 10 and the printer 20 perform, based on the touch operations of the NFC communication, the startup of the management application 18B, and the registration of the printer 20.

It is noted that the processing contents of the wireless control process shown in FIG. 4 is an example. In the embodiment, the portable terminal device 10 connects the printer 20 to the router 2 via the NFC and Wi-Fi Direct (registered trademark). However, the communication standard is not necessarily limited to the above. When, for example, a bi-directional communication via the NFC is available, and the SSID and the like can be set to the printer 20, the portable terminal device 10 may be configured to perform an operation to connect the printer 20 to the router 2 only via the NFC communication. Further, the portable terminal device 10 may be configure to obtain the printer one time token PWT from the printer, to obtain the WFD authentication information, transmit the connection information such as the SSID of the router.

Initial Setting Process

Next, referring to FIG. 6, an initial setting process which is performed in S35 onward in FIG. 5 will be described. As mentioned above, when it is determined that the printer 20 is unregistered in S19 and S21, the printer 20 transmits a registration instruction to register with the server 30 to the management application 18B of the portable terminal device 10. In response to this instruction, the management application 18B of the portable terminal device 10 performs the registration process of the printer automatically. It is noted that the printer 20 may transmit, in S21, only the startup instruction of the management application 18B. The management application 18B asks the user whether or not to execute the registration process of the printer 20 after the startup in S25. Then, when receiving the execution instruction, the management application 18B executed S27 onward. It is noted that the printer 20 may transmit only the startup instruction of the management application 18B in S21. After started up in S25, the management application 18B asks the user whether the registration process of the printer 20 is to be performed. When receiving the execution instruction, the management application 18B performs the process of S27 onward. Thereafter, the management application 18B executes from S27 to the processes shown in FIG. 6, and may execute the registration process.

Figure 5:
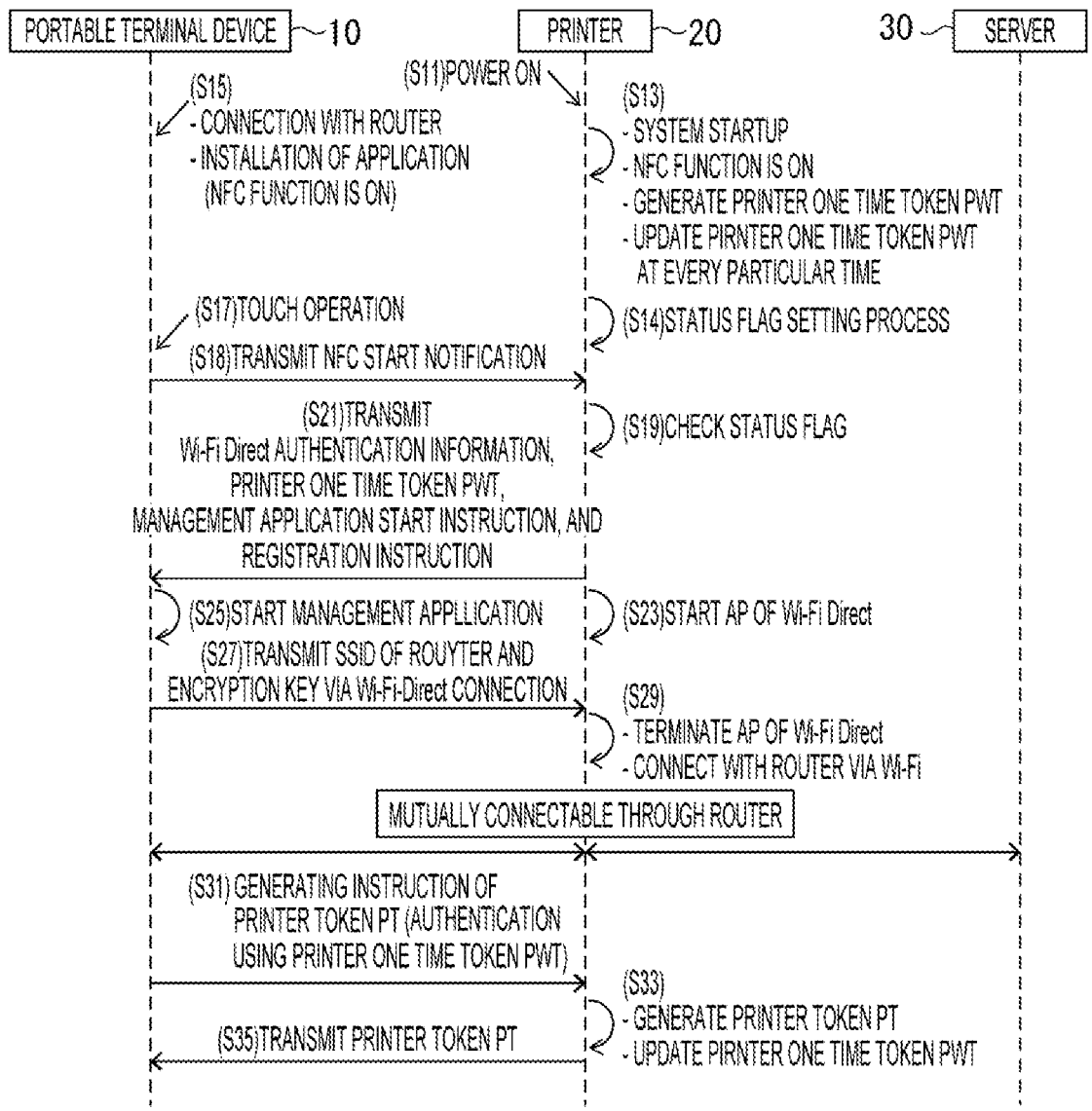
FIG. 5 is a sequence diagram in a case where a wireless control process is performed.
Figure 6:
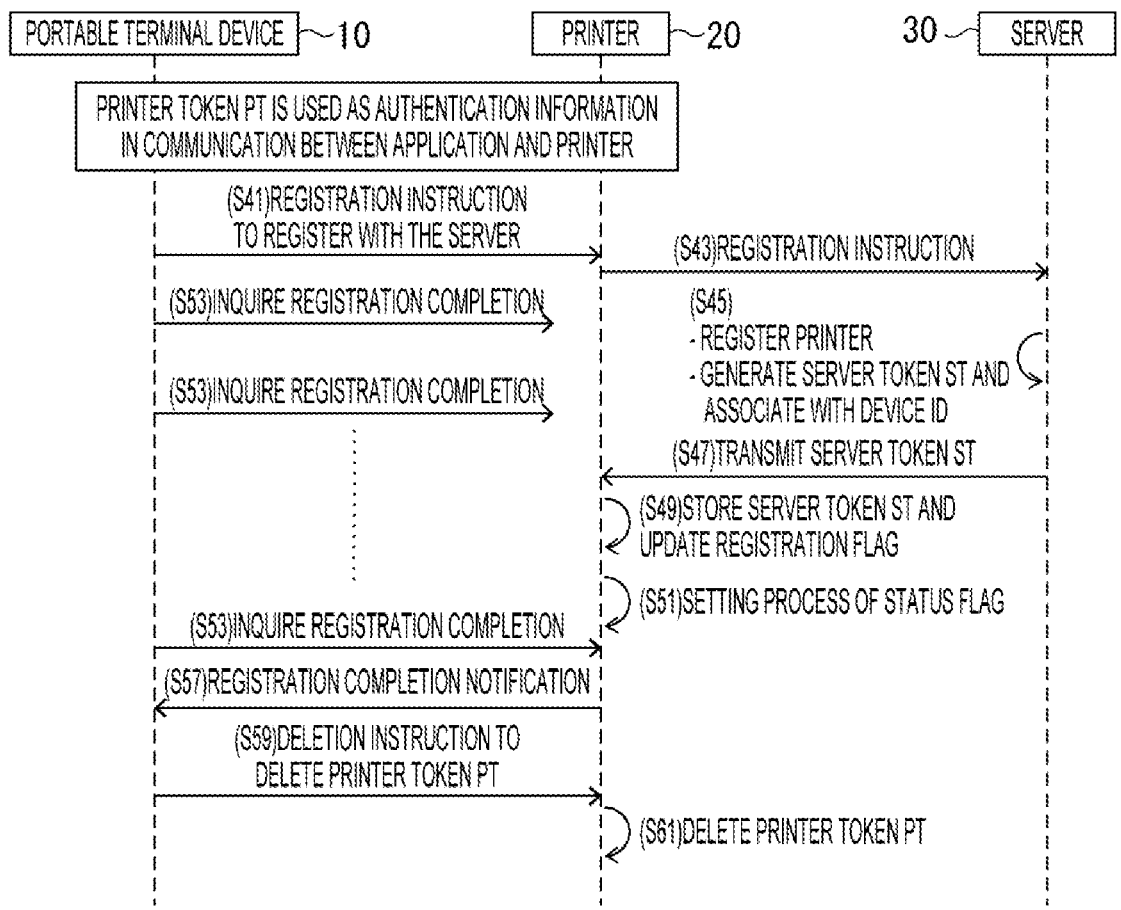
FIG. 6 is a sequence diagram in a case where an initial setting process is performed.

As shown in FIG. 6, in the communication between the portable terminal device 10 (i.e., the management application 18B) and the printer 20, the printer token generated and transmitted in S33 and S35 of FIG. 5 is used as the authentication information. In S41, when the portable terminal device 10 (i.e., the management application 18B) obtains the printer token PT in S35 of FIG. 5, the portable terminal device 10 transmits the registration instruction to register with the server 30 to the printer 20. Obtaining the registration instruction of S41, the printer 20 transmits the registration instruction to the server (S43). A method of according to which the printer 20 obtains the access information of the server 30 is not particularly limited but, for example, the access information (e.g., the URL) of the server 30 may be preset in the printer storage 26B. Alternatively, the printer 20 may be configured to obtain the access information of the server 30 from the portable terminal device 10.

The printer 20 is configured to transmit, in S43, the device ID ("dv1" in this example) of the printer management table PTB, the permitted number of sheets for printing, and the ink remaining amount to the server 30. When the printer 20 is sent from the vender, the permitted number of sheets for printing indicated by the printer token PT is, for example, set to zero. The ink remaining amount may be substantially full. When obtaining the registration instruction from the printer 20 (S43), the server 30 registers the obtained information such as the device ID with the server management table STB (S45). In this way, the information regarding the printer 20 sent from the vender can be registered with the server 30.

Further, the server 30 is configured to generate the server token ST in S45. The server 30 then stores the generated server token ST and the device ID of the printer which obtains the instruction in S43 in the sever storage 32B in an associated manner. In this way, the server 30 can identify the device ID based on the server token ST by obtaining the server token ST together with an instruction from the portable terminal device 10, and can determine which printer 20 is the target of the instruction. It is noted that the server 30 may configured to manage the server token ST in the server management table STB.

When generating the server token ST, the server 30 transmits the generated server token ST to the printer 20 (S47). The printer 20 stores the server token ST obtained from the server 30 in the printer storage 26B (S49). As will be described with reference to FIGS. 9A-9F, the printer 20 notifies the portable terminal device 10 of the server token ST. The portable terminal device 10 performs accessing to the server 30 using the server token ST. By performing the authentication using the server token ST, the server 30 can determine which printer 20 is the target of the charge instruction or the replacement instruction. Further, the printer 20 updates the registration flag 26B5 from a value representing the unregistered status to a value representing the registered status (S49). That is, in response to obtaining of the server token ST from the server 30, the printer 20 determines that the registration of the server 30 has completed and updates the registration flag 26B5.

When the printer 20 executes S49, the condition of completing the registration process, that is, the start condition of the process of FIG. 4 is satisfied, and the printer 20 executes the status flag setting process shown in FIG. 4 (S51). Since the registration flag 26B5 has been updated to the value representing the registered status in S49, the printer makes a negative decision in S1 of FIG. 4 and executes the determination process in S2 onward (S51). The printer 20 sets the status flag 26B4 corresponding to the ink remaining amount, the permitted number of sheets for printing and the like.

On the other hand, after transmitting the registration instruction in S41, the portable terminal device 10 performs polling for periodically asking the printer 20 whether the registration process with the server 30 has been completed (S53). When the printer 20 obtains the server token ST in S47, the printer 20 transmits the registration completion notification indicating that the registration has been completed in response to the inquiry in S53 from the portable terminal device 10 (S57). It is noted that the portable terminal device 10 may not perform the polling, but may execute a process of pausing until the portable terminal device 10 obtains the completion notification from the printer after transmitting the registration instruction in S41.

When obtaining the completion notification in S57, the portable terminal device 10 transmits a deletion instruction to delete the printer token PT to the printer 20 (S59). Then, in response to the deletion instruction received from the portable terminal device 10, the printer 20 executes deletion of the printer token PT (S61). In this way, the printer 20 is in a status where the printer does not accept the control instruction using the printer token PT having been deleted. It is noted that, instead of deleting the printer token PT in accordance with the instruction received from the portable terminal device 10, the printer 20 may be configured to automatically delete the printer token PT when the printer 20 has not received a communication using the printer token PT for a particular time period. Further, the initial setting process executed after the management application 18B is started (see FIG. 5) is not necessarily limited to the registration process shown in FIG. 6. The printing system 1 may charge the permitted number of sheets of the printer 20 by free after executing the registration of the printer 20 with the server 30. In such a case, the portable terminal device 10 and the printer 20 may execute the charging process to increase the permitted number of sheets (e.g., 2000 sheets) by free with the server 30 in the process of S57 onward. Further, the printer 20 and the server 30 may execute a process to synchronize the permitted number of sheets for printing after incrementing the number increase by free.

Printing Process

Figure 7:
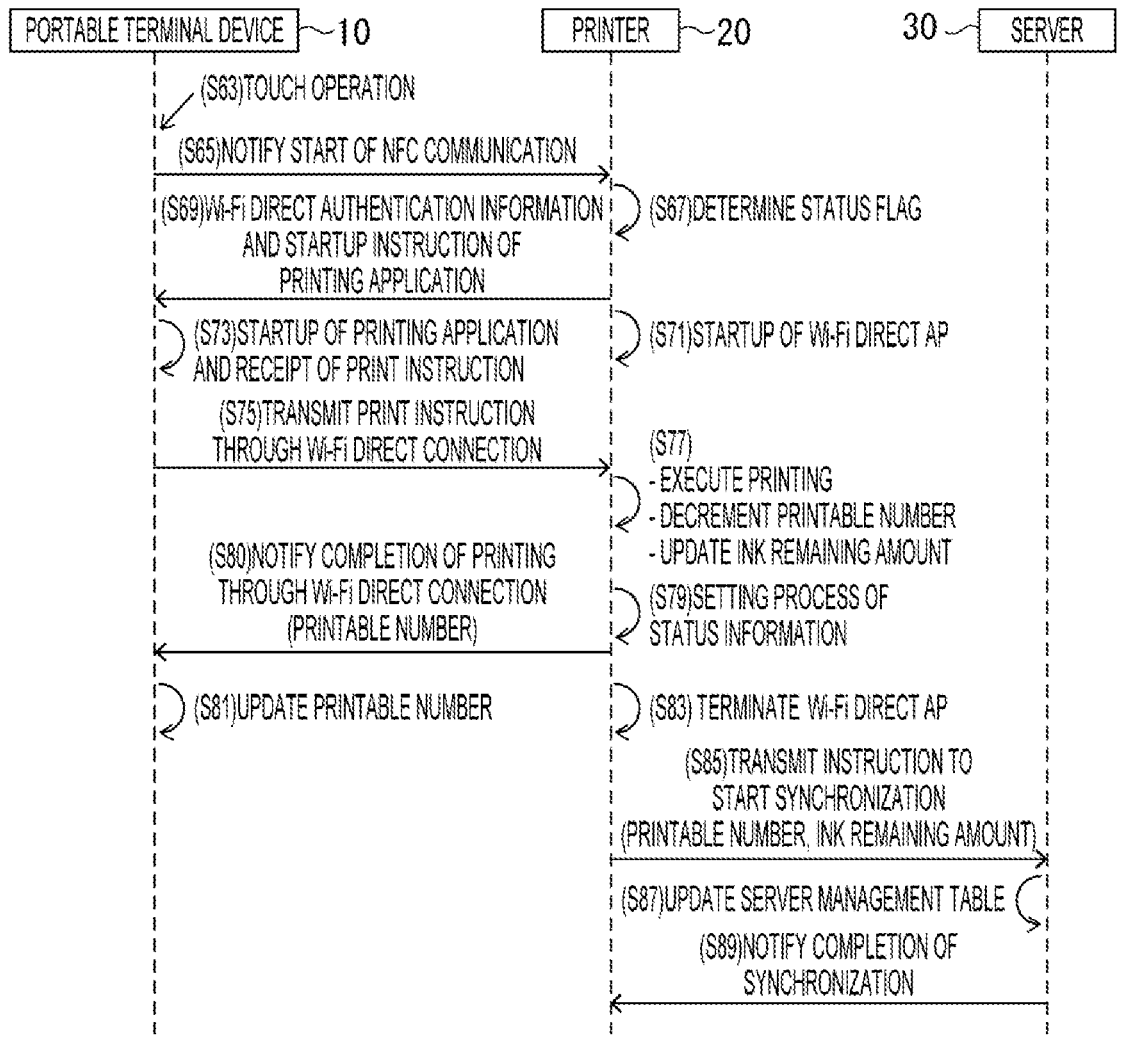
FIG. 7 is a sequence diagram in a case where a printing process is performed.

Next, the printing process performed by the printing system 1 will be described with reference to FIG. 7. It is noted that descriptions of contents and configurations same as those shown in FIGS. 5 and 6 may be omitted where appropriate in the following description. After the processes shown in FIGS. 5 and 6 are completed, the user performs printing with the printer using the NFC communication. Similar to S17 and S18 of FIG. 5, the user performs the touch operation to bring the portable terminal device 10 close to the printer 20 (S63, S65). In response to the touch operation, the printer 20 checks the status flag 26B4 (S67).

For example, the printer 20 determines, in S51 of FIG. 6, that the registration has completed (S1 of FIG. 4: NO), the ink remaining amount is equal to or larger than the threshold remaining amount 26B3 (S2: NO), the permitted number of sheets for printing is equal to or larger than the threshold number of sheets 26B2 (S3: NO), and no device error is occurring (S4: NO). The printer 20 sets the status flag 26B4 to a value "05" (S9). When the touch operation is performed when the printer 20 is in the above status, the printer 20 transmits information instructing the startup of the printing application 18C and the WFD authentication information (S69). Further, the printer 20 starts the WFD application software (S71) and causes the external communication IF 22 of the printer 20 to function as an access point.

Similar to the management application 18B, the printer 20 transmits the startup instruction or a particular URL prompting an installation instruction with respect to the printing application 18C to the portable terminal device 10. The particular URL is, for example, a URL of a web page which is provided by the App Store of Apple Inc., and executes the installation of the printing application 18C. In this way, when the printing application 18C has been installed by obtaining the notification in S69, the portable terminal device 10 starts the printing application 18C (S73). When the printing application 18C has not been installed, the portable terminal device 10 displays a text message such as "do you want to install the printing application?" on the touchscreen panel 14.

The portable terminal device 10 starts the printing application 18C in S73, and receives the print instruction from the user (S73). Based on the operation input with respect to the printing application 18C, the portable terminal device 10 receives the print settings including, for example, the number of sheets for printing, the sheet size, and the magnification. In response to receipt of the print execution instruction based on the operation input to the printing application 18C, the portable terminal device 10 transmits the print instruction to the printer via the WFD communication (S75).

When receiving the print instruction, the printer 20 executes printing based on the print instruction (S77). When the printing is executed, the printer 20 decrement the number of printed sheets from the permitted number of sheets for printing stored in the printer management table PTB to update the permitted number of sheets for printing (S77).

Further, the printer 20 updates the ink remaining amount in the printer management table PTB based on the ink remaining amount detected by the remaining ink detector 24.

Since the permitted number of sheets for printing and the ink remaining amount have been changed, the portable terminal device 10 performs the status flag setting process shown in FIG. 4 (S79). As a result of executing the status flag setting process, when the ink remaining amount is equal to or less than the threshold remaining amount 26B3 (S2: YES), the printer 20 sets a value "02" to the status flag 26B4 (S6) and executes a notification process to the user IF 27 (S10). When the ink remaining amount is larger than the threshold remaining amount 26B3 (S2: NO) and the permitted number of sheets for printing is equal to or less than the threshold number of sheets 26B2 (S3: YES), the printer 20 sets a value "03" to the status flag 26B4 (S7), and executes the notification process to the user IF 27 (S10). When the ink remaining amount is larger than the threshold remaining amount 26B3 (S2: NO), the permitted number of sheets for printing is larger than the threshold number of sheets 26B2 (S3: NO), and a device error is occurring (S4: YES), the printer 20 sets a value "04" to the status flag 26B4 (S8) and executes the notification process to the user IF 27 (S10). When decisions in S2, S3 and S4 are all "NO," the printer 20 maintains the value "05" as a value set to the status flag 26B4.

In S80, the printer 20 notifies the completion of printing and updated permitted number of sheets for printing to the portable terminal device 10 via the WFD communication. Then, the portable terminal device 10 updates the permitted number of sheets 18E based on the permitted number of sheets for printing obtained from the printer 20 (S81). Further, after executing S79, the printer 29 terminates the WFD application (S83). The printer 20 performs a process of synchronizing the permitted number of sheets for printing and the ink remaining amount with those stored in the server 30. For example, after executing S83, the printer transmits the permitted number of sheets and the ink remaining amount in the printer management table PTB to the server 30 together with an instruction to start synchronization (S85). Then, in S87, the server 30 updates the permitted number of sheets and the ink remaining amount in the server management table STB based on the information obtained in S85. Thus, the printer management table PTB of the printer 20 and the server management table STB of the server 30 can be synchronized. Thereafter, the server 30 transmits a completion notification indicating completion of the synchronization to the printer 20 (S89). In this way, when the value "05" is set to the status flag 26B4, the printing process can be performed in accordance with start of the NFC communication.

If some device error is being occurred at a time when the touch operation in S63 or S65 is performed, and the value "04" is set to the status flag 26B4, the printer 20 transmits, in S69, a URL of a support page in which a method of resolving the currently occurring error to the portable terminal device 10. Then, upon obtaining the URL from the printer 20 via the NFC communication in S69, the portable terminal device 10 starts the browser software 18D and displays the support page for the user. By reviewing the support page as displayed, the user can perform an appropriate error resolving process (e.g., removal of jammed sheets, execution of test printing, and the like).

Web Page Displaying Process by Authentication Using User IF 27 of Printer 20

The printer 20 according to the present embodiment is configured such that when the status flag 26B4 is set to "02"

at a time when the touch operation of the NFC communication is detected (FIG. 4), the printer 20 causes the portable terminal device 10 to display the replacement request page, while when the status flag 26B4 is set to "03" (FIG. 4), the printer 20 causes the portable terminal device 10 display the charge page. At this time, the portable terminal device 10 can display the replacement request page or the charge page corresponding to the printer without requesting the authentication operation with respect to the printer 20.

As a comparative example, a case in which the charge page and the replacement request page are displayed by executing the authentication using the user IF 27 of the printer 20 will be described with reference to FIGS. 8 and 9. It is noted that the printing system 1 according to the present embodiment may be or may not be configured to perform a method of displaying the charge page and the like with performing the authentication using the user IF 27 shown in FIG. 8. That is, the process shown in FIG. 8 is only for illustrating the process of displaying the charge page or the like based on the touch operation of the NFC communication described later (see FIG. 10), and the printing system 1 is not necessarily configured to perform the process shown in FIG. 8.

In the example shown in FIG. 8, the printer 20 is equipped with an internal server configured to display, for example, the status information of the printer 20 itself. The internal server in this embodiment refers to the printer 20 functioning as the web server (e.g., EWS: Embedded Web Server). When a Web page of the EWS (hereinafter, occasionally referred to as an "EWS page") is accessed via the browser software of the portable terminal device 10, the printer 20 displays, on a display screen 51 of the touchscreen panel 14, an address box 53 indicating the URL of the EWS, and an WES page 55 showing the page content.

The printer 20 receives a password input in an input box 57 of the EWS page 55, and performs the authentication using the password. When a login button 59 on the EWS page 55 is operated, the printer 20 performs the password authentication using the password input in the input box 57. When the authentication is successful, the printer displays an EWS page 61 on the display screen 51 (FIG. 8B). The printer 20 further displays, on the EWS page 61 displayed immediately after the login, a link 63 for accessing the server 30, and a logout button 65 for instructing execution of logging out. Further, the printer 20 displays a text massage such as "move to website" on the link 63. When receiving an operation to the link 63 on the EWS page 61, the printer 20 performs a physical authentication with use of the user IF 27. The physical authentication is a process of authentication to prevent the charge or the replacement request by an unauthorized user, and for checking whether the user is near the printer 20, that is the user is the authorized user capable of using the printer 20 by receiving the operation by the user to the printer 20.

When receiving an operation such as the operation of the link 63, the printer 20 causes the portable terminal device 10 to display a popup screen 67 prompting an operation of the user IF 27. Further, the printer 20 displays the screen 69 on the user IF 27 of the printer 20 itself and receives the physical authentication. The printer displays a text message 71 such as "allow access to advanced settings" and the like, an OK button 72, and a cancel button 73 on the screen 69. When the OK button 72 is operated, the printer 20 determines that the physical authentication is successful, and cause the portable terminal device 10 to display the top page 75 of the server 30 on the display screen 51. At this time, the printer 20 and the server 30 may perform an authentication using the server token ST mentioned above. In this case, after the server 30 identifies the device ID of the printer 20 using the server token ST, the server 30 displays the top page 57 for receiving the charge and the replacement request regarding the identified printer 20 (i.e., the device ID).

As shown in FIG. 8D, the server 30 displays the URL of the top page 75 in the address box 53 of the top page 75, and a text message 77 such as "the permitted number of sheets for printing" and the like on the top page 75. The permitted number of sheets for printing is information of, for example, the permitted number of sheets in the server management table STB. The server 30 is further configured to display a charge button 79, and a printer replacement button 81 on the top page 75. When the operation to the charge button 78 is received by the touchscreen panel 14 of the portable terminal device 10, the server 30 displays a charge page 91 as shown in FIG. 9B. When an operation to the printer replacement button 81 is received, the server 30 displays a replacement request page 105 shown in FIG. 9E. Thus, when the physical authentication using the printer 20 is successful, the server 30 displays the top page, the charge page and the replacement request page targeted to the printer 20.

FIGS. 9B, 9C and 9D show transition of display of the charge pages 91, 92 and 93. The server 30 displays the charge pages 91-93 on the portable terminal device 10 and receives an instruction for charging. It is noted that, in each of the charge pages 91-93, the address box 53 is not depicted to avoid complication. When the charge button 78 is operated, the server displays the charge page 91 on the portable terminal device 10 and displays multiple charge buttons 95 on each of which the additional number to be added to the permitted number and the fee to buy the additional number are indicated. When the touch operation is performed on one of the multiple charge buttons 95 (e.g., the charge button indicating 100 sheets as the additional number of sheets in the example shown in FIGS. 9A-9D), the server 30 displays the charge page 92. Further, the server 30 displays, on the charge page 92, the additional number of sheets (i.e., the charging number of sheets) and the fee therefor, and additionally, an input box 97 in which a credit card number is to be input and a payment button 99 to receive a payment instruction. The user inputs the card number of the credit card to be used for the payment in the input box 97 and perform the touch operation to the payment button 99. It is noted that a method of receiving the charged number of sheets is not necessarily limited to the above-described method of selecting one of selective items indicating different additional numbers, but a method of directly input the additional number may be employed. Further, a method of payment is not necessarily limited to the payment using the credit card, but other methods such as cash payment, electronic money payment, or a bank account transfer.

In response to the touch operation of the payment button 99, the server 30 collects the fee from the credit card designated via the input box 97 and performs an addition process to increase the permitted number of printable sheets. For example, the server 30 transmits an instruction, to the printer 20, to increase the permitted number of sheets to increase the permitted number of sheets set to the printer token PT by the additional number of sheets indicated on the charge page 92. Thereafter, the server 30 obtains the permitted number of sheets after the additional number was added from the printer 20, and updates the permitted number of sheets for printing in the server management table STB. In this way, even in a case where the permitted number of sheets on the printer 20 side has been reduced due to execution of printing, the reduced amount can be reflected to the server management table STB. The printer 20 transmits the permitted number to the portable terminal device 10, thereby the permitted number 18E being updated.

The server 30 is configured to display information 101 regarding the device ID (e.g., a serial number) of the printer 20 on the charge page 91 and the like in order to notify the printer 20 subjected to be charged. The device ID is of the printer 20 subjected to be charged, which is identified based on the server token ST used for the authentication in the communication from the printer 20. When the charging of the permitted number is completed, the server 30 displays the charge page 93 on the portable terminal device 10. The server 30 displays information about the number of sheets increased by charging, and messages 103 indicating the payment has been completed, and the permitted number after charging should be checked on the charge page 93. In this way, the charging of the permitted number can be performed.

FIGS. 9E and 9F show transition of display of the replacement request pages 105 and 106. The server 30 displays the replacement request pages 105 and 106 on the portable terminal device 10 and receives a request to replace the printer 20. When the touch operation is performed to a printer replacement button 81 on the top page 75, the server 30 displays the replacement request page 105 on the portable terminal device 10. The server 30 further displays an input box 107 for inputting a delivery address of the replacement printer 20 and a replacement request button 108 to instruct to perform the replacement request on the replacement request page 105.

The user inputs the delivery address of the replacement printer 20 in the input box 107 and operates the replacement request button 108. In response to operation of the replacement request button 108, the server notifies a work person or the like of the vender of an instruction to ship the replacement printer 20 to the delivery address input to the input box 107. Further, the server 30 displays the replacement request page 106 on the portable terminal device 10. The server 30 displays messages 109 indicating that the replacement request was received, a reception number, and the user need to wait until arrival of the replacement printer 20 on the replacement request page 106. In this way, delivery of the replacement printer 20 can be requested to the server 30.

Web Page Displaying Process by Touch Operation Via NFC Communication

Figure 10:
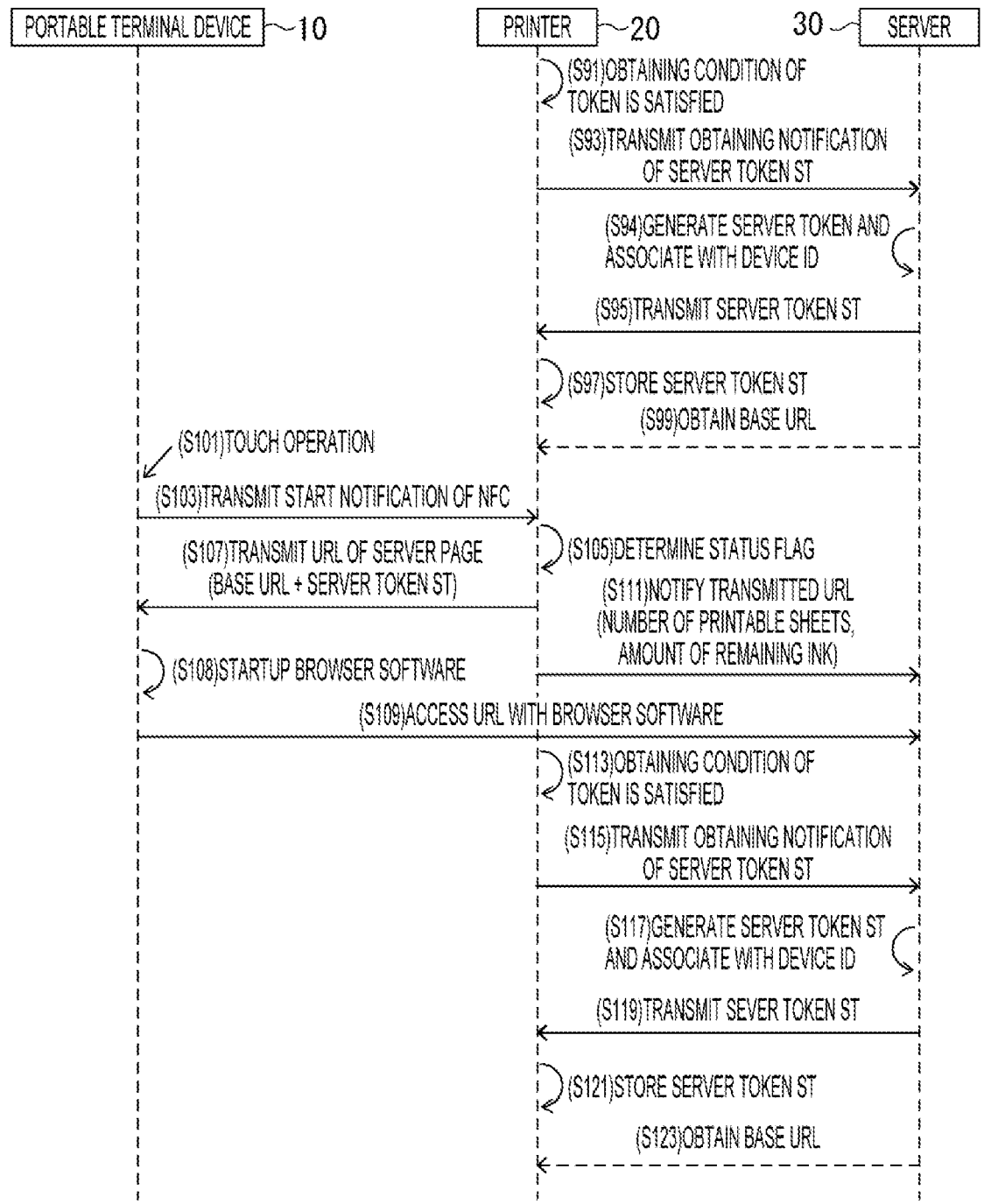
FIG. 10 is a sequence diagram in a case where a Web page displaying process by a touch operation in the NFC communication is performed.

Next, a process of displaying the web page of the server 30 (hereinafter, occasionally referred to as a "server page") in response to the touch operation of the NFC communication will be described with reference to FIG. 10. FIG. 10 is a sequence diagram when the web page displaying process in response to the touch operation of the NFC communication. The printer 20 causes the portable terminal device 10 to display the charge page 91 or the replacement request page 105 shown in FIG. 10 based on the value of the status flag 26B4 in the touch operation is performed.

Initially, the printer 20 determines the token obtaining condition to obtain the server token ST from the server is satisfied in S91. As mentioned above, the printer 20 executes the authentication of the communication with the server using the server token ST. The server 30 identifies the target printer 20 (i.e., the device ID) subjected to the charge or the replacement request by means of the server token ST. Further, as described later, the printer 20 transmits the server token ST to the portable terminal device 10. With use of the server token ST, the portable terminal device 10 accesses the server 30 and displays the charge page 91 (see FIG. 9B) or the replacement request page 105 (see FIG. 9E) identified by the server token ST without performing the physical authentication as described with reference to FIG. 8. If the same server token ST are kept used for the same printer 20, there is a possibility that the same server token ST is generated by fraudulent acts such as a brute force attack and the charge page 91 or the replacement request page 105 is accessed. Therefore, the server 30 set a particular effective period to the server token ST. When the effective period is elapsed, the access with use of the server token ST is not allowed. In this way, the security of access to the charge page 91 or the like can be improved. It is noted that the server 30 may continue to use the same server token ST without setting an effective period therefor.

When the effective period is set as described above, there is a possibility that that, when the touch operation of the NFC communication is performed, the effective period of the server token ST to be transmitted to the portable terminal device 10 is expired. Therefore, the printer 20 accesses the server 40 at ever particular time period and updates the server token ST (S93-S97). The particular time period may be, for example, shorter than the effective period of the server token ST. Accordingly, as a satisfying condition of the token obtaining condition to obtain the server token ST in S91 described above, the condition that the particular period elapses. It is noted that other operational conditions such as turning on of the power, execution of printing may be adopted as the token obtaining condition.

When the token obtaining condition is satisfied in S91, the printer transmits an obtaining notification notifying that the printer 20 is requiring to obtain the server token ST to the server 30 (S39). When receiving the obtaining notification of S93, the server 30 generates the server token ST and associates the server token ST with the device ID of the printer 20 which is the transmission source of the notification (S94). A method of identifying the device ID is not necessarily limited to a particular one. When the effective period of the server token ST held by the printer 20 has not expired, the device ID may be identified with use of the server token ST. On the other hand, when the effective period of the server token ST has expired, the device ID may be transmitted from the printer 20 to the server 30.

The server 30 transmits the server token ST generated in S94 to the printer 20 (S95). The printer 20 stores the server token obtained in S95 in the printer storage 26B, thereby updating the server token ST (S97). In this way, the effective period of the server token ST can be maintained (i.e., updated). Then, the printer 20 executes S93-S97 in accordance with the satisfaction of the token obtaining condition in S91 to periodically update the server token ST, while receiving the touch operation from the portable terminal device 10. For example, as mentioned above, after executing S6 in FIG. 4, the printer 20 displays a text message "perform NFC touch to request for replacement of printer" on the user IF 27 (S10). Seeing the display, the user performs the touch operation (S101, S103). Then, in response to the touch operation, the printer 20 checks the value of the status flag 26B4 (S105).

When the ink remaining amount is equal to or less than the threshold remaining amount 26B3 (S2: YES), the value "02" is set to the status flag 26B4 as shown in FIG. 4. In this case, the printer 20 transmits the URL guiding the replacement request page 105 shown in FIG. 9E as the server page of the server 30 to the portable terminal device 10 via the NFC communication (S107). The URL transmitted to the portable terminal device 10 is determined, for example, by adding the server token ST to a URL which serves as a base when accessing to the replacement request page 105 of the server, as indicated below:

> URL of server page=base URL+server token ST

The base URL is defined such that, if the server token ST added to the base URL is notified to the server 30 as a variable (also referred to as a query parameter), the replacement request page 105 of the device ID (i.e., the printer 20) identified, on the server 30 side, based on the server token ST can be displayed. The information of the base URL is stored, for example, in the printer storage 26B in advance.

As shown in S99 of FIG. 10, the printer 20 may obtain the information of the base URL from the server in accordance with acquisition of the server token ST (S93-S97). Alternatively, the printer 20 may obtain information of the base URL from a server other than the server 30 of the vender. In this way, when the base URL is changed due to relocation or modification of the server 40, by updating the base URL information, the replacement request page 105 of the server 30 after the relocation or modification of the server 30 can be accessed.

After executing S105, the printer 20 transmits the URL, which is the base URL of the replacement request page 105 added with the server token ST, to the portable terminal device 10 via the NFC communication (S107). When the portable terminal device 10 obtains the URL transmitted from the printer 20, the portable terminal device 10 starts the browser software 18D (S108), the accesses the obtained base URL with the browser software (S109). In this way, only by performing the touch operation of the NFC communication, the user can display the replacement request page 105 in accordance with the status of the printer 20, that is, in accordance with lowering of the ink remaining amount, thereby replacement of the printer 20 being performed quickly. Further, even a user (e.g., a general user) who has not installed a dedicated application such as the management application can perform the replacement request of the printer 20. For example, even the user who has not performed the registration process shown in FIGS. 5 and 6 can perform the replacement request.

The server 30 can identify the printer 20 to be replaced based on the device ID associated with the server token ST added to the URL. The server 30 can display the replacement request page 105 of the printer 20 that needs to be replaced (i.e., that is in use). It is noted that the number of users who can approach the printer 20 and perform the touch operation of the NFC communication are limited, and a certain level of security can be ensured. Therefore, the server 30 according to the present embodiment is configured to display the replacement request page 105 upon receiving the access with use of the server token ST, without requiring the authentication operation (e.g., input of a password) to the portable terminal device 10. In this way, the workload of the user in the replacement request can be reduced. It is noted that the server 30 may be configured to request for the authentication information such as a password before displaying the replacement request page 105.

Displaying of the charge page 91 can be performed in a similar manner. For example, as shown in FIG. 4, when the permitted number of sheets for printing is equal to or less than the threshold number of sheets (S3: YES), the value "03" is being set to the status flag 26B4. In this case, the printer 20 transmits the URL guiding the charge page 91 shown in FIG. 9B as the server page of the server 30 to the portable terminal device 10 (S107). The printer 20 uses the URL at which the charge page 91 of the printer 20 corresponding to the server token ST can be displayed on the server 30 side as the above-mentioned base URL by notifying the server 30 of the server token ST added to the base URL as a variable. It is noted that the printer 20 may perform the updating process as in S99 for the above-described URL. Further, when there is a common portion (e.g., a host name, a domain name and the like) between base URLs of the replacement request page 105 and the charge page 91, the common portion may be obtained from the server 30 and updated (S99).

The printer 20 transmits the URL, which is the base URL of the charge page 91 added with the server token ST, to the portable terminal device 10 via the NFC communication (S107). In this way, the charge page 91 on which charging can be instructed for the printer 20 currently used on the portable terminal device 10. The user can display the charge page 91 in accordance with reduction of the permitted number of sheets for printing and perform charging only by performing the touch operation of the NFC communication. Further, the charging can be performed without installing the management application 18B.

After executing S107, the portable terminal device 10 notifies the server 30 of the URL which has been notified, in S107, to the portable terminal device 10 (S111). There is a possibility that the printer has notified the portable terminal device 10 of the URL, but due to some unknown reason, the portable terminal device 10 cannot access the URL (i.e., the server 30). In such a case, it is difficult for the server 30 to grasp to which URL the accesses have been attempted, and how many times the attempts to access the URL are failed. In contrast, when the printer 20 notifies the server 30 of the URL which has been transmitted to the portable terminal device 10, the server 30 can check whether the URL obtained from the printer 20 is normally accessed from the portable terminal device 10. Further, the server 30 collects the number of failures of accesses. Further, if there is no access S109 from the mobile terminal device a particular period of time after the notification in S111, the server 30 can notify the printer 20 of an access error.

In S111, the printer 20 notifies the server 30 of the permitted number of sheets and the ink remaining amount in the printer management table PTB. Accordingly, the server 30 can determine whether the charging or the replacement request is to be performed based on the information such as the latest permitted number of sheets of the printer 20 and the like. For example, by obtaining the permitted number of sheets for printing from the printer 20, the server 30 can display the accurate permitted number of sheets for printing on the charge page 91 of the charge page 93 after charging has been completed. Further, by obtaining the ink remaining amount from the printer 20, the server can check whether the remaining ink amount is less than the threshold remaining amount 26B3.

The printer 20 may add the information of the permitted number of sheets or the ink remaining amount in the printer management table PTB to the URL to be transmitted to the portable terminal device 10 in S107. In this way, the server 30 can grasp the permitted number and the like of the printer management table PTB based on the information (e.g., the permitted number of sheets) included in the URL accessed in S109. In this case, the printer 20 may not notify the permitted number of sheet and the like in S111.

Further, the printer 20 notifies, in S111, the server 30 of the language setting information set to the device settings in the printer management table PTB. Alternatively, the printer 20 may add the language setting information set to the device settings in the printer management table PTB to the URL transmitted in S107. In this way, when the charge page 91 and the replacement request page 105 are displayed, the server 30 can display the same using a language according to the language setting information obtained from the printer 20, that is, using the language the user uses.

Further, the printer 20 notifies, in S111, the server 30 of regional information, or may add the same to the URL transmitted in S107. The regional information is, for example, information which is set to the printer 20 by the vender, and can identify sales areas (e.g., Japan, Asia, USA, EU, and the like) of the printer 20. In this way, for example, the server 30 can check the regional information of the URL accessed in S109 and shift the charging process to a server according to the region indicated by the regional information. Accordingly, the processing load on the server 30 side can be distributed. Further, the printer 20 may change the domain name of the URL to be notified to the portable terminal device 10 in S107 in accordance with the regional information. Accordingly, it is possible to change the access destinations to which the portable terminal device 10 accesses in S109 for each region.

Further, similar to S91-S97, the printer 20 may perform the updating process of the server token ST after the touch operation was performed as shown in S113, S115, S117, S119, S121 of FIG. 10. That is, as the token obtaining condition, a condition in which the touch operation is performed may be adopted. For example, the server 30 deletes the server token ST which is used every time when the charging or the replacement request is received. By making the server token ST which is use once invalid, the security can be improved. In such a case, the printer 20 may execute the update of the server token ST after the touch operation as shown in S113-S121. Further, the printer 20 may obtain the base URL from the server 30 after the touch operation as in S99 (S123). Further, as in S91-S97, S99 of FIG. 10, the printer 20 may perform the updating process of the server token ST or the obtaining process of the base URL after or before the printing process in FIG. 7 (e.g., before S63 or after S89).

In the embodiment described above, the portable terminal device 10 is an example of a terminal device. The management application 18B is an example of an application program. The printer 20 is an example of a recording device. The short-range communication IF 21 is an example of a short-range wireless communication interface. The external communication IF 22 is an example of a wireless communication interface. The tank 23 is an example of a reservoir. The print engine 25 is an example of a recording engine. The printer controller 26 is an example of a controller. The threshold number 26B2 is an example of a permission threshold value. The NFC is an example of a short-range wireless communication. The server token ST is an example of server-side identification information. S1 is an example of determining of whether the recording device is registered with the server. S2 is an example of determining of whether a colored agent remaining amount indicating a remaining amount, in the reservoir, of the colored agent is equal to or less than a remaining threshold value. S3 is an example of determining of whether a record permission amount is equal to or less than a permission threshold value. S21 and S107 are examples of transmitting notification information corresponding to a status, regarding the recording service, of the recording device itself to the terminal device via the short-range wireless communication. S47, S95, and S119 are examples of obtaining of the server-side identification information. S111 is an example of notifying of the server of information regarding the URL and the server-side identification information, and updating of the record permission amount stored in the server.

According to the embodiment described above, the following effects can be achieved.

(1) The printer 20 of the above embodiment provides a printing service (an example of a recording service according to aspects of the present disclosures) in which the printing operation by the print engine 25 is performed within a range of the permitted number of sheets (the recording permission amount of aspects of the present disclosures) that permits the printing operation by the print engine 25. The printer 20 transmits information (e.g., registration instruction, charge page 91, replacement request page 105 and the like) corresponding to the status of the printer 20 itself (e.g., a registration status of the server 30, the permitted number of sheets for printing, the ink remaining amount) related to the printing service to the portable terminal device 10 of the NFC communication (S21, S107) in accordance with execution of the NFC communication between the short-range communication IF 13 and the portable terminal device 10.

According to the above configuration, notifications corresponding to the status of the printer 20 itself (e.g., the registration status to the server 30, the ink remaining amount, the permitted number of sheets for printing, and the like) can be sent to the user. Further, the printer 20 transmits the notification information to the portable terminal device 10 (e.g. the user) existed within an area communicable via the short-range wireless communication, i.e., within a relatively short distance. In this way, notification information necessary to use the printing server can be transmitted to the users who are in the vicinity of the printer 20, that is, likely to be authorized users. Further, leakage of the notification information can be suppressed. Furthermore, the user can obtain the notification information by simply performing the touch operation. Thus, the service for users can be improved.

(2) The portable terminal device 10 is communicable with the server 30 involved in the printing service. The printer 20 transmits, in S107, the URL (an example of access destination information according to the present disclosures) to access the server 30 from the portable terminal device 10 as the notification information. In this way, the portable terminal device 10 can access an appropriate web page of the server 30 based on the URL obtained from the printer 20. It is noted that the access destination information according to aspects of the present disclosures is not necessarily limited to the URL but, for example, a particular folder path of the server 30.

(3) The server 30 is configure to receive a charge instruction (an example of an increase instruction according to aspects of the present disclosures) to increase the permitted number of sheets. The printer 20 determines whether the permitted number of is less than or equal to the threshold number of sheets 26B2 (S3: YES), the printer 20 transmits, in S107, the URL of the charge page 91 for receiving the charge. According to this configuration, when the permitted number decreases, it becomes possible to cause the portable terminal device 10 to display the charge page 91 simply by performing the touch operation of the NFC communication. This reduces the user's workload in the charge process.

(4) The printer 20 has the tank 23 storing the ink (an example of a colored agent according to aspects of the present disclosures). The print engine 25 performs printing on a sheet (e.g., a printing sheet, an OHP sheet, and the like) using the ink. The server 30 is configured to receive the replacement request for the printer 20. The printer 20 determines whether the ink remaining amount (an example of the remaining amount of the colored agent) is equal to or less than the threshold remaining amount 26B3 (S2). When the remaining ink amount is equal to or less than the threshold remaining amount 26B3 (S2: YES), the printer 20 transmits, in S107, the URL of the replacement request page for receiving the replacement request. In this way, when the ink remaining amount is lowered, it becomes possible to cause the portable terminal device 10 to display the replacement request page 105 simply by performing the touch operation of the NFC communication. This reduces the workload of the user in the replacement request process.

In the above embodiment, the printer 20 executes the determining process of S2 before S3 in FIG. 4. According to this configuration, the notification of charging can be prioritized over the notification of the replacement. The reason why such a configuration is adopted is that, even if the charging is performed at a stage where the ink remaining amount is low, the ink may run out before the permitted number of sheets are used up. In such a case, it becomes necessary to perform a process of transferring the permitted number of sheets from the old printer 20 to the new printer 20. Therefore, by performing the determination of S2 before S3, it is possible to prevent the process of transferring the permitted number of sheets from occurring. The troublesome operation described above may become necessary, but barring that, the printer 20 may execute the determining process of S3 before S2.

(5) The server is a web server capable of providing web services. In S107, the printer 20 transmits the URL of the server page of the server 30 as the access destination information. According to this configuration, the portable terminal device 10 can display the web page for the charging or the replacement request by accessing the notified URL with use of the browser software 18D and the like. Thus, the portable terminal device 10 can display a web page according to the status of the portable terminal device 10 itself which is related to the printing service.

(6) The server is configured to set a server token ST that identifies the printer 20. The printer 20 obtains the server token ST from the server 30 at S47, S95, or S119. The printer transmits the URL of the server page with the server token ST appended to the base URL in S107. According to this configuration, when the transmitted URL is accessed by the portable terminal device 10, the server 30 can determine the access is targeted to which printer 20 based on the server token ST of the accessed URL. Then, it is possible to display the charge page 91 to execute the charging to the target printer 20, or the replacement request page 10t to perform the replacement request.

(7) The printer 20 is configured to transmit the information of the URL of the server page transmitted in S107 (i.e., base URL+server token ST) in S11. According to this configuration, the server 30 can check whether the URL of the server page obtained from the printer 20 is accessed by the portable terminal device 10 normally and successfully.

(8) The printer 20 may obtain the information on the base URL of the server page from the server 30 or the like (S99). According to such a configuration, even when the base URL is changed due to relocation or modification of the server 30, by updating the base URL, it becomes possible to make the portable terminal device 10 access the replacement request page 105 or the charge page 91 after the relocation/modification.

(9) The portable terminal device 10 is configured to register the printer 20 with the server 30 using the management application 18B. The printer 20 determines whether the printer 20 itself is registered with the server 30 (S1). When the printer 20 determines that the printer 20 itself has not been registered with the server 30 (S1: YES), the printer transmits, to the portable terminal device 10, the URL encouraging the startup and installation of the management application 18B, a registration instruction (an example of information related to the application program according to aspects of the present disclosures) instructing the installed management application to register the printer 20 with the server 30. According to this configuration, when the management application 18B is not installed in the portable terminal device 10, it is possible to prompt the user for installation. When the management application 18B has already been installed, it is possible to prompt the user to start the management application 18B or to execute the registration process using the management application 18B.

(10) The printer 20 is equipped with the external communication IF 22 configured to perform the WFD communication according to a communication method different from the NFC communication. In response to performing the NFC communication between the short-range communication IF 21 and the portable terminal device 10, in S21, the printer 20 transmits the startup instruction of the management application 18B and further the connection information (e.g., the SSID and the encryption key) used for connection of the WFD communication to the portable terminal device 10 via the NFC communication. Then, the printer obtains the information from the management application 18B via the WFD communication (S27). According to the above configuration, the startup instruction for the management application 18B is transmitted from the printer 20 to the portable terminal device 10 via the NFC communication, while the process after the management application 18B can be performed via the WFD communication. According to the above configuration, it is unnecessary to perform a bidirectional communication via the NFC communication, and manufacturing cost of the short-range communication if 21 can be reduced.

(11) In the above-described embodiment, the communication compliant to the NFC (Near Field Communication) standard is used as the short-range wireless communication. According to the configuration, it is possible to perform transmission of notification information only to users within a short distance from the printer 20 where the NFC communication can be performed.

(12) The printer 20 is configured to communicate with the server 30 which is configured to store the device ID and the permitted number of sheets for printing in the server management table STB in an associated manner. In response to the NFC communication being performed in S101 and S103, the printer 20 transmits the permitted number of sheets for printing of the printer 20 itself to the server to update the permitted number of sheets of the sever 30 (S111). In this way, when the portable terminal device 10 accesses the server after execution of the NFC communication, the permitted number of sheets on the printer 20 side can be displayed on the portable terminal device 10. That is, the portable terminal device 10 can perform processes with use of the latest permitted number of sheets for printing which is synchronized with the same on the printer 20 side.

Modifications

Although the various examples have been described in detail above, they are only examples and do not necessary limit aspects of the present disclosures. Rather, the above-described examples can be further modified in various ways without departing from aspects pf the present disclosures.

In the above-described embodiment, the permitted number of sheets is stored in the printer management table PTB, and the like. Then, the number of printable sheets is reduced at every execution of printing to determine whether printing can be performed. In contrast, the permitted number of sheets for printing may be managed with use of the number which is increase at every execution of printing. In this case, for example, a value obtained by subtracting a cumulative number of sheets printed, which is the cumulative number of sheets printed, from a cumulative number of sheets charged, which is the cumulative number of charged sheets, may be used as the permitted number of sheets for printing (i.e., permitted amount for printing).

The contents of each sequence diagram and flowchart above and the order of processes are only examples. For example, the printer 20 may be configured to perform only the notification process based on at least one status flag 26B4 among the status flags 26B4 which are set in S5 to S9. For example, the printer 20 may be configured to perform a process to guide only the charge page 91 based on the permitted number of sheets for printing.

The printer 20 notifies the URL of the charge page 91 or the replacement request page 105 to the portable terminal device 10 based on whether the status flag 26B3 is set to the value "02" or "03." It is noted that the same information may be notified to the portable terminal device 10. For example, the printer 20 may be configured to notify the URL of the top page 75 shown in FIG. 9A to the portable terminal device 10 in S107. In this way, the top page 75 with the printer 20 selected may be displayed on the portable terminal device 10, and the charging and replacement request can be received from the top page 75.

Further, as mentioned above, the process contents shown in FIG. 8 are of the comparative example. The confiscation may be modified such that the server 30 can display the charge pages 91 to 93, and the replacement request pages 105 and 106 in FIGS. 9E and 9F, but not the top page 75.

In the above-described embodiment, the portable terminal device 10, which is a smartphone, is adopted as the terminal device. However, such a configuration is only an example and other devices such as a desktop PC, a notebook PC, a tablet PC and the like can also be adopted as the terminal device.

The printing system 1 according to the above-described embodiment is a system configured to record the device IDs and the permitted numbers of sheets for printing in the server management table STB in an associated manner to manage the permitted number for each printer 20. The configuration is not necessarily limited to the above. For example, the printing system 1 may be configured to associate the portable terminal device 10 with a user for management of the permitted numbers of sheets. For such a management, as information regarding user may include a user ID registered with the management application 18B, a user ID of the user who is using the portable terminal device 10.

The configuration of the printer 20 described above is an example. For example, the printer 20 may be configured without the external communication IF 22.

The printer 20 is configured to store the printer management table PTB in the printer storage 26B. However, such configuration is only an example and the printer 20 is not necessarily limited to such a configuration. For example, the printer 20 may be equipped with a reading IF configured to read an IC card, memory card, and the like. Then, the printer 20 may read and use information for the printer management table PTB, such as device ID and the permitted number of sheets for printing, from the IC card attached to the reading IF. In other words, the printer 20 may be configured to manage the printer management table PTB with an IC card or the like.

Alternatively, the printer 20 may be configured to store the information for the printer management table PTB, such as the permitted number of sheets for printing, in a memory provided to an ink tank included in the 23. If the printer 20 is a laser beam printer, the printer 20 may be configured to store the information for the printer management table PTB in a memory provided to a toner cartridge, a memory provided to a photosensitive drum. That is, the printer 20 may be configured to store the printer management table PTB in a memory other than the memory where the printer program 26B1 is stored.

The configuration of the printing system 1 in the above embodiment is an example. The printing system 1 may be configured without the server 30. Alternatively, the printing system 1 may be equipped with a plurality of portable terminal devices 10, a plurality of printers 20, and a plurality of servers 30. In this case, the plurality of portable terminal devices 10 may use a single printer 20, and/or a single portable terminal device 10 may use the plurality of printers 20.

The printer 20 may be configured such that the user can refill the ink (each ink tank of the tank 23 may be replaceable). Other means for replenishing consumables such as ink include a configuration in which the tank 23 can be filled from a bottle containing ink. In a configuration where the tank 23 is replaceable, the tank 23 (e.g., an ink cartridge) removable from the printer 20 is an example of a reservoir according to aspects of the present disclosures. When the printer 20 is a printer other than an inkjet printer, for example, when the printer 20 is a laser printer, a toner housing, which stores toner and is not replaceable, or a replaceable toner cartridge is an example of the reservoir according to aspects of the present disclosures. Therefore, a notification of replacement of the reservoir may be a notification of replacement of the printer 20 itself that houses the colorant, or a notification of replacement of a tank or other component that stores the colorant therein.

As the recording device, an inkjet printer 20 is used, but a laser or thermal printer is also acceptable. The recording device is not limited to printers for individual users, but can also be a commercial or industrial printing machine. The recording device may be a multifunctional peripheral having a scanning function, a copying function, and a facsimile function, in addition to the printing function. Alternatively, the recording device may be a scanner, a copier, or a facsimile machine. The recording permission amount is not limited to the permitted number of sheets for printing, but can be the permitted number of times of executions of scanning or facsimile transmission/reception. The recording device can also be a laser marker that uses a laser to mark a metal member or the like. Accordingly, the recording medium according to aspects of the present disclosures is not necessarily limited to sheets of paper, but can also be a metal member or the like. The record permission amount is not necessarily limited to the permitted number of sheets, but may also be the permitted number of executions of the laser processing.

The record permission amount according to aspects of the present disclosures is not necessarily limited to the permitted number of sheets for printing. For example, the record permission amount may be permitted consumption amount of ink or toner. The record permission amount may be the number of dots (unit: pixels) of ink allowed to be ejected or the amount of ink allowed to be used (unit: ml). Alternatively, the record permission amount may be specified by the number of revolutions of the photosensitive drum or other members that rotates with the printing operation.

The controller according to aspects of the present disclosures may not be provided with a storage such as the printer storage 26B.

What is claimed is:

1. A recording device, comprising:
a recording engine configured to perform recording on a recording medium;
a short-range wireless communication interface capable of performing a short-range wireless communication; and
a controller,
wherein the recording device is configured to provide a recording service of performing at least one recording operation using the recording engine within a record permission amount, the record permission amount being an amount that recording using the recording engine is permitted, and
wherein the controller is configured such that, in response to performing the short-range wireless communication between the short-range wireless communication interface and a terminal device, the controller performs transmitting notification information corresponding to a status, regarding the recording service, of the recording device to the terminal device via the short-range wireless communication.

2. The recording device according to claim 1, further configured to communicate with a server related to the recording service,
wherein the controller is configured to transmit, in the transmitting of the notification information, access destination information for accessing from the terminal device to the server as the notification information.

3. The recording device according to claim 2,
wherein the server is configured to receive an increase instruction to increase the record permission amount, and
wherein the controller is configured to perform:
determining whether the record permission amount is equal to or less than a permission threshold value; and
when it is determined, as a result of the determining, that the record permission amount is equal to or less than the permission threshold value, transmitting the access destination information to receive the increase instruction to increase the record permission amount in the transmitting of the notification information.

4. The recording device according to claim 2,
further comprising a reservoir in which a colored agent is stored;
wherein the recording engine is a print engine configured to perform printing on a sheet using the colored agent,
wherein the server is configured to receive a replacement request to replace the reservoir, and
wherein the controller is configured to perform:
determining whether a colored agent remaining amount indicating a remaining amount, in the reservoir, of the colored agent is equal to or less than a remaining threshold value;
when it is determined, as a result of the determining, that the colored agent remaining amount is equal to or less than the remaining threshold value, transmitting the access destination information to receive the replacement request to replace the reservoir in the transmitting of the notification information.

5. The recording device according to claim 2,
wherein the server is a Web server, and
wherein the controller is configured to transmit, in the transmitting of the notification information, a URL of the server as the access destination information to the terminal device.

6. The recording device according to claim 5,
wherein the server is configured such that server-side identification information to identify the recording device is set to the server, and
wherein the controller is configured to perform:
obtaining the server-side identification information; and
transmitting, in the transmitting of the notification information, the URL with adding the server-side identification information.

7. The recording device according to claim 6,
wherein the controller is configured to perform notifying the server of information regarding the URL and the server-side identification information transmitted to the terminal device in the transmitting of the notification information.

8. The recording device according to claim 5, further configured to obtain the information regarding the URL from the server.

9. The recording device according to claim 1,
wherein the terminal device is configured to register the recording device with the server using an application program related to the recording service, and
wherein the controller is configured to perform:
determining whether the recording device is registered with the server; and
when it is determined, as a result of the determining whether the recording device is registered with the server, that the recording device is unregistered with the server, transmitting information related to the application program as the notification information.

10. The recording device according to claim 9,
further comprising an other wireless communication interface configured to perform a wireless communication according to a wireless communication method different from the short-range wireless communication,
wherein, in response to execution of the short-range wireless communication between the short-range wireless communication interface and the terminal device, the controller is configured to perform, in the transmitting of the notification information:
transmitting connection information to be used for connection of the wireless communication, in addition to the notification information, to the terminal device via the short-range wireless communication; and
obtaining information from the application program via the wireless communication.

11. The recording device according to claim 1,
wherein the short-range wireless communication is compliant to Near Field Communication standard.

12. The recording device according to claim 1, further configured to be communicate to a server in which identification information of the recording device and the record permission amount are stored in an associated manner,
wherein the controller is configured to perform:
in response to the short-range wireless communication interface and the terminal device performing the short-range wireless communication, updating the record permission amount stored in the server by transmitting the record permission amount for the recording device itself to the server.

13. A recording system, comprising:
a recording device; and
a terminal device,
wherein the recording device including:
a recording engine configured to perform recording on a recording medium:
a short-range wireless communication interface capable of performing a short-range wireless communication; and
a controller,
wherein the recording device is configured to provide a recording service of performing at least one recording operation using the recording engine within a record permission amount, the record permission amount being an amount that recording using the recording engine is permitted, and
wherein the controller is configured such that, in response to performing the short-range wireless communication between the short-range wireless communication interface and a terminal device, the controller performs transmitting notification information corresponding to a status, regarding the recording service, of the recording device to the terminal device via the short-range wireless communication.

14. A non-transitory computer-readable recording medium for a recording device including a recording engine configured to perform recording on a recording medium, a short-range wireless communication interface capable of performing a short-range wireless communication, and a controller, the non-transitory computer-readable recording medium contains computer-executable instructions which cause, when executed by the controller, the recording device to perform:
providing a recording service of performing at least one recording operation using the recording engine within a record permission amount, the record permission amount being an amount that recording using the recording engine is permitted, and
in response to performing the short-range wireless communication between the short-range wireless communication interface and a terminal device, transmitting notification information corresponding to a status, regarding the recording service, of the recording device to the terminal device via the short-range wireless communication.

* * * * *